(12) United States Patent
Addepalli

(10) Patent No.: US 12,039,358 B1
(45) Date of Patent: Jul. 16, 2024

(54) EFFICIENT MANAGEMENT OF PACKET FLOW INFORMATION AT NETWORK FUNCTION VIRTUALIZATION SERVICES

(71) Applicant: Amazon Technologies, Inc., Seattle, WA (US)

(72) Inventor: Meher Aditya Kumar Addepalli, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 443 days.

(21) Appl. No.: 17/385,778

(22) Filed: Jul. 26, 2021

(51) Int. Cl.
G06F 9/455 (2018.01)
G06F 16/22 (2019.01)
H04L 45/74 (2022.01)
H04L 47/41 (2022.01)

(52) U.S. Cl.
CPC ...... *G06F 9/45558* (2013.01); *G06F 16/2255* (2019.01); *H04L 45/74* (2013.01); *H04L 47/41* (2013.01); *G06F 2009/45595* (2013.01)

(58) Field of Classification Search
CPC ................................................ G06F 9/45558
See application file for complete search history.

(56) References Cited

U.S. PATENT DOCUMENTS

| | | | |
|---|---|---|---|
| 6,993,021 | B1 | 1/2006 | Chuah et al. |
| 7,782,782 | B1 | 8/2010 | Ferguson et al. |
| 7,865,586 | B2 | 1/2011 | Cohn |
| 8,244,909 | B1 | 8/2012 | Hanson et al. |
| 8,331,371 | B2 | 12/2012 | Judge et al. |
| 8,358,658 | B2 | 1/2013 | Flynn et al. |
| 8,478,896 | B2 | 7/2013 | Ehlers |
| 8,693,470 | B1 | 4/2014 | Maxwell et al. |
| 10,757,009 | B2 | 8/2020 | Deb et al. |
| 2008/0225875 | A1 | 9/2008 | Wray et al. |
| 2022/0075766 | A1* | 3/2022 | Levy .................. H04L 45/7453 |

OTHER PUBLICATIONS

Albert Greenberg, et al "VL2: A Scalable and Flexible Data Center Network" Communications of the ACM, vol. 54, No. 3, Mar. 2011, pp. 1-10.

Chuanxiong Guo, et al "BCube: A High Performance, Server-centric Network Architecture for Modular Data Centers" SIGCOMM'Aug. 17-21, 2009, pp. 1-12.

(Continued)

*Primary Examiner* — Charlie Sun
(74) *Attorney, Agent, or Firm* — Robert C. Kowert; Kowert, Hood, Munyon, Rankin & Goetzel, P.C.

(57) ABSTRACT

A representation of an identifier of a packet flow is stored in a particular entry within a particular entry group of a first object maintained at a packet processing service, along with an expiration criterion for information pertaining to the packet flow, including a representation of an action to be performed. The action is performed after it is retrieved from an element identified within a second object based on an entry identifier of the particular entry and a group identifier of the particular group. In response to receiving a packet of another packet flow, respective indications that one or more in-use entries of the particular entry group (whose expiration criteria are met) are available for re-use are stored, without receiving an indication that the corresponding packet flows have terminated.

20 Claims, 11 Drawing Sheets

(56) References Cited

OTHER PUBLICATIONS

"On the Impact of Packet Spraying in Data Center Networks", Advait Dixit, et al., 2013, pp. 1-9.
U.S. Appl. No. 16/136,142, filed Sep. 19, 2018, Paul John Tillotson.
U.S. Appl. No. 16/136,138, filed Sep. 19, 2018, Paul John Tillotson.
U.S. Appl. No. 16/136,137, filed Sep. 19, 2018, Paul John Tillotson.
U.S. Appl. No. 16/136,133, filed Sep. 19, 2018, Paul John Tillotson.
U.S. Appl. No. 16/136,131, filed Sep. 19, 2018, Paul John Tillotson.
U.S. Appl. No. 16/196,691, filed Nov. 20, 2018, Paul John Tillotson.
U.S. Appl. No. 16/196,709, filed Nov. 20, 2018, Bashuman Deb.
U.S. Appl. No. 17/000,150, filed Aug. 21, 2020, Bashuman Deb.
U.S. Appl. No. 17/218,024, filed Mar. 30, 2021, Baihu Qian, et al.
U.S. Appl. No. 17/218,031, filed Mar. 30, 2021, Baihu Qian, et al.
U.S. Appl. No. 17/218,036, filed Mar. 30, 2021, Baihu Qian, et al.
U.S. Appl. No. 17/218,039, filed Mar. 30, 2021, Baihu Qian, et al.

* cited by examiner

EvictSingleExpiredEntryUponAdd 801

EvictAllExpiredEntriesInBucketUponAdd 804

EvictUptoNEntriesInBucketUponAdd 807

EvictUptoNEntriesInBucketUponLookup 810

EFFICIENT MANAGEMENT OF PACKET FLOW INFORMATION AT NETWORK FUNCTION VIRTUALIZATION SERVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment. As demand for virtualization-based services at provider networks has grown, more and more networking and interconnectivity-related features, including support for virtualized network functions, may have to be added to meet the requirements of applications being implemented using the services.

BRIEF DESCRIPTION OF DRAWINGS

FIG. 8 illustrates flow table entry eviction policies which may be implemented at a network function virtualization service, according to at least some embodiments.

Figure 1:
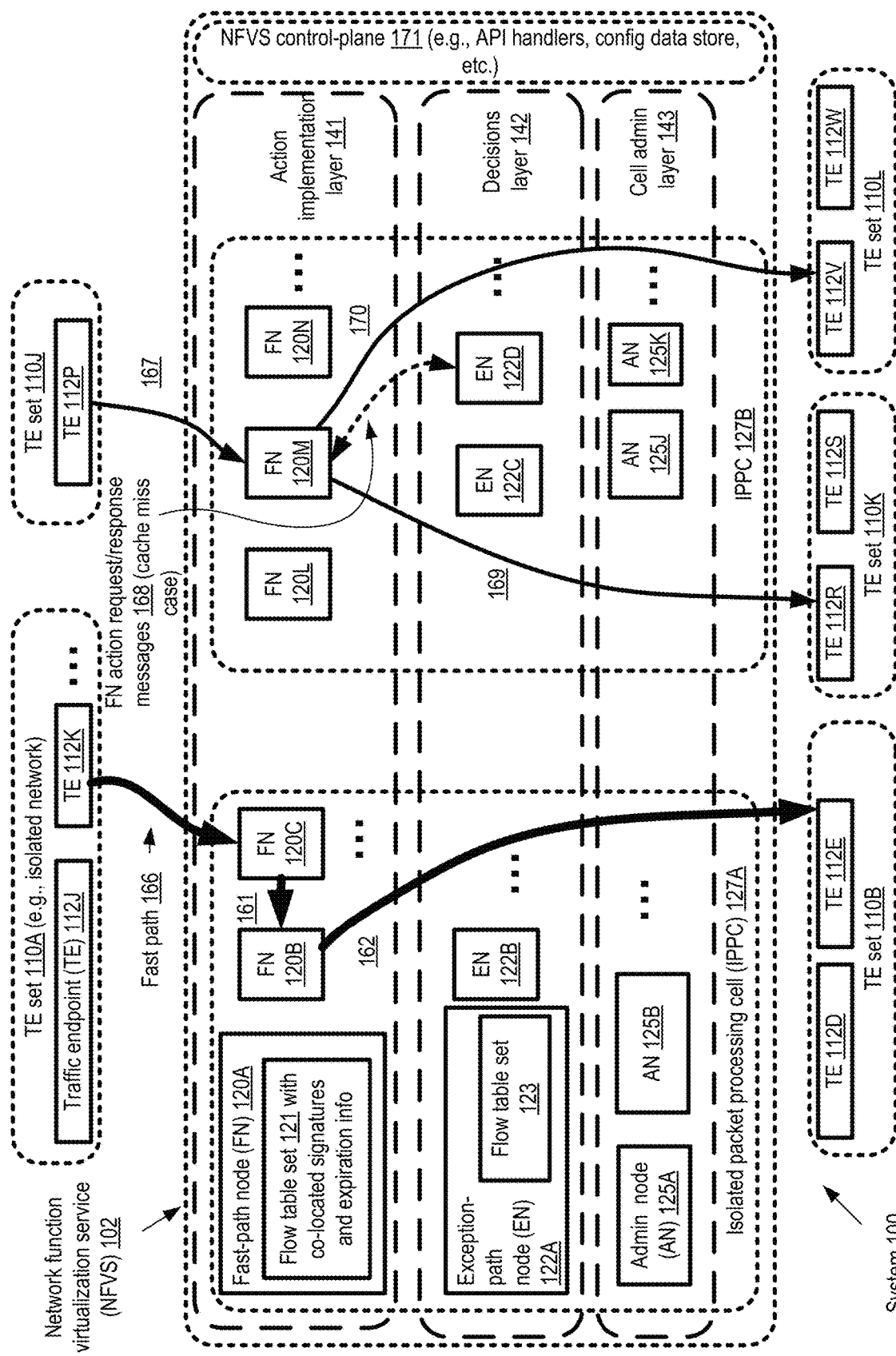
FIG. 1 illustrates an example system environment in which a network function virtualization service utilizing efficient techniques for managing packet flow information may be implemented, according to according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for the efficient management of information about packet flows at network function virtualization services, such that packet processing tasks can be performed with a lower computational overhead than is feasible using traditional techniques. Specifically, the present disclosure relates to techniques for efficiently evicting entries in flow tables maintained at network function virtualization services. In such services, there is typically no explicit indication of when a packet flow has terminated; the packets of the flow simply stop arriving. Because of this, expiration information has to be maintained for each flow, such as a time after which, if no additional packets of the flow are received in the interim, information associated with the flow can be deleted. In the disclosed design, the expiration information is co-located in the same table as flow signatures which are used to determine whether the routing action and other metadata for a given packet's flow is already present at a node of the service. As a result, expired entries can be evicted much more efficiently when a decision that a new flow has been encountered is made, in contrast to designs in which the expiration information is stored separately. Using the disclosed approach, the number of CPU cache misses that are incurred for evictions can be reduced. The disclosed techniques can lead to substantial reduction in CPU utilization (and hence greater throughputs and lower latencies) at the nodes of the network function virtualization service, especially in scenarios in which large numbers (e.g., millions) of packet flows are being processed per second, which can require high eviction rates.

A network function virtualization service (NFVS), also referred to as a packet processing service, can be implemented at a provider network or cloud computing environment to enable NFVS clients to deploy various combinations of customized packet processing actions suited for their applications, without the clients having to be concerned about infrastructure management tasks such as scaling up the resources needed, managing failure events at resources being used for packet processing, and the like. The logic of packet processing tasks or actions (also referred to as network functions) to be performed for packets flowing between client-specified groups of network endpoints, such as virtualized or physical servers located within respective isolated networks, can be specified by the clients of the network. The NFVS then implements the logic using resources provisioned and managed by the NFVS itself, without requiring individual resources to be acquired or decommissioned by clients. Because the clients do not have to concern themselves with specifics of the resources used for the network functions to be performed, the network functions can be said to be virtualized. At least some of the network functions or actions may comprise respective routing or forwarding operations for various categories of data packets.

An NFVS can store information pertaining to the packet processing actions (e.g., including client-specified rules evaluated to perform the actions, metadata such as metrics associated with various packet flows, and the like) at a per-packet-flow level. A given packet flow can be distinguished from other packet flows based on a collection of flow attributes, which can for example include the source and destination network addresses for a given direction of traffic, the source and destination network ports, the networking protocol being used, and so on. Packets of a given flow can, in general, continue to be transmitted for unpredictable amounts of time: some flows may last only a few seconds, while others can last for hours, days or longer, depending on the kind of applications for which the packets are being transmitted. A large-scale NFVS, such as an NFVS implemented for a world-wide base of clients of a cloud provider network, may have to store information for millions of packet flows concurrently, and can be implemented using nodes arranged in several layers of a distributed NFVS architecture. A portion of memory of one or more nodes of a distributed NFVS may be automatically assigned to store the per-packet-flow information for a given packet flow, for example shortly after the first packet of the flow is received at the NFVS. An explicit request indicating the start of a packet flow is not required; instead, the fact that information for a packet flow needs to be stored can be deduced when the first packet of the flow is received. The information, retrieved from the memory for subsequent packets of the same flow, can then be used to forward the packets of the flow, or to take other actions such as transforming the packets, according to the packet processing rules indicated by the client on whose behalf the packets of the flow are to be processed.

As more packets of different flows arrive and are processed at an NFVS node, the remaining free space available for storing per-packet-flow information at the node shrinks. Just as the initiation of a packet flow is not indicated explicitly, the end or termination of a given packet flow is also typically not indicated by an explicit message directed to the NFVS; packets of the packet flow may simply stop arriving, or may be separated from one another by such a long time interval that the flow may be assumed to be terminated for practical purposes. As a result, the NFVS has the responsibility of determining how best to evict or remove the per-packet flow information of a given flow from the memory at an NFVS node, thereby freeing up space in which information of new flows can be stored, without causing performance problems for in-progress flows or the new flows. The term "eviction" of information pertaining to a given packet flow from a set of objects or data structures maintained by an NFVS, as used herein, refers to the logical freeing up of the portion of memory that was in use for the information, such that that portion of memory can be re-used for storing corresponding types of information of a different packet flow. The phrase "evicting an entry" of a multi-entry object maintained at the NFVS, as used herein, refers to the eviction of the information stored within that entry.

According to the techniques for managing flow information introduced herein, the information pertaining to a given packet flow can be distributed among a number of different data objects or data structures at a given NFVS node. One of the objects, referred to as a signature table, can be organized as a collection of buckets, with each bucket comprising a group of one or more entries for respective flows which are assigned to the bucket based on flow attributes. As such, buckets may be referred to as entry groups. Within a given entry of a given bucket of the signature table, a signature of a flow (e.g., a shortened representation of a longer identifier of the flow) as well as expiration criteria for the information pertaining to the flow is stored. Using the shortened representation of the larger identifier makes some types of operations (such as lookups of flow information) more efficient. The expiration criteria can, for example, be based on a maximum permitted idle time of the flow (i.e., the maximum amount of time for which information pertaining to the flow is to be retained without receiving an additional packet of the flow). The expiration criteria may be modified when a new packet of the same flow arrives at the NFVS, in effect extending the time period for which the NFVS is willing to retain the information for the flow.

When a packet belonging to a packet flow PF1 is received at an NFVS node, the flow attributes of PF1 are determined, and a particular bucket B of the signature table is identified (using the flow attributes of PF1) as a candidate bucket for information pertaining to PF1 (including PF1's signature and expiration criteria). The signature of the flow is computed, and an attempt is made to determine whether B already includes an entry which contains PF1's signature. If no such entry corresponding to PF1 exists, an entry to store PF1's signature has to be found in B1.

During the search for an entry E1 to accommodate PF1's signature in the signature table, the set of entries of B can be traversed, e.g., in sequential order or in parallel. During the traversal, if an in-use entry whose expiration criterion is satisfied is encountered, the contents of that entry may be evicted and that entry may be re-used to store PF1's own signature and PF1's information expiration criterion within B. In some cases, multiple such in-use signature table entries whose expiration criteria are satisfied may be evicted during a traversal initiated in response to the arrival of the PF1 packet, thereby freeing up space for future packet flows' signatures and expiration criteria. If an empty entry (or an entry whose contents have already been marked as evicted, invalidated, or removed) is encountered during the traversal of B's entries, that entry can be used to store PF1's signature and expiration criteria. Regardless of whether an entry is evicted to accommodate PF1 information, or an empty entry is used for PF1, corresponding entries within other objects which are used for storing additional flow-specific information are identified, and used to store that additional flow-specific information (such as packet processing rules or action representations, metrics, status information etc.) By combining the signatures and the expiration criteria within the bucket entries of the signature table, instead of (for example) storing the expiration criteria in a different data structure or object, the process of evicting entries is made extremely efficient. In some cases, the maximum number of entries contained in a given bucket of the signature table can be selected such that the entire set of entries of the bucket can be accommodated within a single cache line (or a few cache lines) of a CPU being used for an NFVS node, so the process of evicting all the expired signature table entries of a bucket only requires a single cache line access (or accesses of a small number of cache lines). As CPU cache hits (e.g., within a level 1 (L1), level 2 (L2) or level 3 (L3) cache) are often substantially (e.g., by an order of magnitude in some cases) faster than cache misses, eviction of packet flow information can be made extremely fast. In NFVSs at which packets are processed for hundreds of thousands or millions of flows per second, such speedup in evicting flow information can have a substantial benefit.

As one skilled in the art will appreciate in light of this disclosure, certain embodiments may be capable of achieving various advantages, including some or all of the following: (a) improving the throughputs and latencies for packet processing operations at cloud computing environments substantially, without requiring additional resources to be deployed relative to other designs for managing packet flow information, (b) reducing errors associated with packet drops resulting from delays in processing packets and/or (c) reducing the variance in performance achieved for different flows being managed at a network function virtualization service.

According to some embodiments, a system may comprise one or more computing devices. The computing devices may include instructions that upon execution on or across the computing devices cause the computing devices to store, in a particular entry of a plurality of entries within a particular bucket of a plurality of buckets of a signature table of an application implemented using a plurality of nodes of an NFVS of a cloud provider network, (a) a signature corresponding to a first packet flow and (b) an expiration criterion for information pertaining to the first packet flow. The first packet flow may be distinguished from other packet flows based on one or more attributes of a set of flow attributes including at least a source address, a destination address, and a network protocol; other attributes may also be used in some embodiments. In various embodiments, the information pertaining to the first packet flow may indicate a routing action to be implemented for packets of the first packet flow. At least a portion of the information, including for example a representation of the routing action or a rule to be evaluated to determine the routing action, may be stored in a multi-element object separate from the signature table in some embodiments. In some cases, the amount of memory or storage needed for representations of the actions in the multi-element object may differ from one application to another, or from one packet flow to another; as such, the multi-element object may potentially comprise variable-length elements.

With respect to one or more packets of the first packet flow, the routing action may be performed in various embodiments after accessing at least some information pertaining to the first packet flow from an element of the multi-element object. The specific element from which the information is accessed may be selected from the multi-element object based at least in part on (a) a bucket identifier of the particular bucket and (b) an entry identifier of the particular entry in which the signature of the first packet flow is stored within the particular bucket.

In response to (a) receiving a particular packet of a second packet flow at a node of the plurality of nodes and (b) determining that the particular bucket of the signature table is a candidate bucket for containing a signature of the second packet flow, a number of operations may be performed at the node in at least some embodiments. These operations may include initiating eviction of respective signatures stored within one or more entries of the particular bucket including a second entry. The eviction of a signature stored within the second entry may be initiated in various embodiments without receiving an eviction request associated with a packet flow whose signature is stored within the second entry. In at least one embodiment, the second entry's contents may be removed, invalidated, overwritten or evicted without receiving an indication that the packet flow whose signature was stored in the second entry has terminated or ended. In various embodiments, eviction of the signature stored within the second entry is initiated based at least in part on a determination that an expiration criterion stored in the second entry has been satisfied. In one implementation, one or more bits or flags of an entry (such as the second entry) may be set to indicate whether the entry is currently in use, or whether its contents have been evicted/invalidated.

In at least one embodiment, the second entry may be used to store a second signature corresponding to the second packet flow, and a second expiration criterion for information pertaining to the second packet flow. In some embodiments, a representation of an action to be implemented for packets of the second packet flow may be stored in an element of the multi-element data object which is selected from among the plurality of elements of the multi-element object based at least in part on an entry identifier of a second entry.

According to some embodiments, a key associated with a given packet flow may be computed using the flow attributes, e.g., by concatenating some number of flow attributes in a pre-selected order. From among the buckets of the signature table, the specific bucket to be used for information of the given packet flow may be identified using the key. The signature of a packet flow may in some embodiments be expressed using a first number of bits, which differs from the number of bits used for the key. The key may in some embodiments be larger (require more bits) than the signature. The key may be considered a unique identifier for a flow, while the signature may represent a shortened version of the identifier in such embodiments. The signatures of any two flows may have a high probability (but less than a 100% probability) of being distinct in various embodiments. In some embodiments, the specific bucket to be used for the packet flow may be selected at least in part by applying a hash function (or multiple hash functions) to the key for the packet flow. In one embodiment, the signature for a packet flow may be computed by applying a hash function (or multiple hash functions) to the key. In at least one implementation, a hash function used for computing a signature for a packet flow may differ from a hash function used for selecting a bucket of the signature table for that packet flow.

In some embodiments, a cache line size of a processor cache (e.g., an L1, L2 or L3 cache of a CPU) which is accessed for various computations at a node of the NFVS may be determined, and a maximum number of entries to be includes within a given bucket of the signature table may be determined based at least in part on that cache line size. For example, if a processor cache comprises 512 bits, a flow signature comprises 32 bits and a representation of an expiration criterion for a flow's information comprises 32 bits, the maximum number of entries in the bucket may be set to 8 (512/(32+32)).

According to at least some embodiments, the NFVS may be organized into several logical layers, including a fast-path layer and an exception-path layer, with each layer comprising a plurality of nodes. The fast-path layer may, as indicated by the name, be designed to quickly implement packet processing actions which have already been determined, at the exception-path layer, for a given flow and cached at the fast-path layer. The exception-path layer may respond to the initial packets of various packet flows by accessing client-provided logic for the actions to be taken for the flows, generating executable actions based on the logic, and transmitting representations of the actions to the fast-path layer for execution. In at least one embodiment, the efficient techniques for storing and evicting flow-specific information may be implemented at one or both layers of the NFVS. In an embodiment in which the eviction techniques are implemented at both layers, different expiration criteria may be stored and used for a given flow at the different layers. For example, a fast-path information expiration criterion may be used for information pertaining to a packet flow PF1 which is stored at the fast-path layer, while an exception-path information expiration criterion (different from the criterion used at the fast-path layer) may be used for information pertaining to PF1 which is stored at the exception-path layer.

In some embodiments, entries may be evicted from a bucket of a signature table in response to a determination that a signature for a new flow (a flow whose signature is not currently present in the signature table) is to be stored. In at least one embodiment, entries may instead (or in addition) be evicted from a bucket of a signature table during a lookup operation on the bucket. In the lookup operation, one or more entries of the bucket may be traversed to determine whether an entry containing a signature of a flow PF1 corresponding to a received packet is already present in the bucket, and expired entries may be evicted during the lookup (regardless of whether an entry for PF1 happens to be present in the bucket or not).

In at least some embodiments, as indicated above, an NFVS may be implemented as part of a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include a virtualized compute service (VCS), data processing service(s) (e.g., map reduce, data flow, and/or other large scale data processing techniques), data storage services (e.g., object storage services, block-based storage services, or data warehouse storage services), NFVSs or packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, or a cloud compute service). This service may offer compute instances of the kind discussed above (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units (CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane (such as the operations of the CPSG and CPNG discussed above) and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which a network function virtualization service utilizing efficient techniques for evicting entries from flow tables may be implemented, according to according to at least some embodiments. As shown, system 100 comprises resources of a multi-layer network function virtualization service (NFVS) 102. The NFVS 102 may comprise an action implementation layer 141, a decisions layer 142 and a cell administration layer 143, as well as a set of service-level control-plane resources 171 including API handlers, metadata stores/repositories and the like in the depicted embodiment. Individual ones of the layers 141, 142 and 143 may comprise a plurality of nodes, such as fast-path nodes (FNs) at action implementation layer 141, exception path nodes (ENs) at decisions layer 142, and administration nodes (ANs) at cell administration layer 143. Resources of layers 141, 142, and 143 may be organized into groups called isolated packet processing cells (IPPCs) 127 (e.g., 127A or 127B) in various embodiments, with a given IPPC 127 comprising some number of FNs, some number of ENs, and some number of ANs. For example, IPPC 127A may include FNs 120A, 120B and 120C, ENs 122A and 122B, and ANs 125A and 125B in the depicted embodiment, while IPPC 127B may comprise FNs 120L, 120M and 120N, ENs 122C and 122D, and ANs 125J and 125K. Individual nodes such as FNs, ENs and/or ANs may be implemented using some combination of software and hardware at one or more computing devices in different embodiments—e.g., in some embodiments, a given FN, EN or AN may comprise a virtual machine or compute instance running at a host managed by a virtualized computing service of a provider network, while in other embodiments FNs, ENs and/or ANs may be implemented using non-virtualized servers.

The resources of the NFVS 102 may be used to build a variety of networking applications on behalf of NFVS clients, such as applications for forwarding/routing packets between isolated networks, applications for multicasting packets, virtual private networking applications and the like in different embodiments. Individual IPPCs 127 may be assigned to implement the logic of one or more instances of such an application in some embodiments, with the traffic associated with that application being processed (at least under normal operating conditions) without crossing IPPC boundaries. For example, in the depicted embodiment, IPPC 127A may have been assigned to a networking application for transmitting packets between at least a traffic endpoint set (TE set) 110A and TE set 110B, while IPPC 127B may have been assigned to an application for transmitting packets between at least TE set 110J and TE sets 110K and 110L. A given TE set 110 may, for example, comprise a set of resources within an isolated virtual network of a virtualized computing service (VCS) of a provider network. Individual ones of the isolated networks may have associated private IP address ranges, such that addresses assigned to resources within a given isolated network may not be visible to resources outside the isolated network, and such that at least by default (e.g., prior to the assignment of an IPPC implementing a virtual routing application), a pathway between resources within different isolated networks may not necessarily be available.

In various embodiments, instances of networking applications, such as virtual traffic hubs or virtual routers that perform routing between isolated networks, may be set up in response to programmatic requests received from customers or clients of the NFVS 102. Such requests may, for example, be received at API handlers of the NFVS control-plane 171. In response to a client's request or requests indicating TE sets 110A and 110B within respective isolated networks, a virtual traffic hub built using IPPC 127A may be assigned to forward packets among a set of isolated networks in the depicted embodiment. Similarly, in response to another client's request (or the same client's request) to enable multicast connectivity among a set of isolated networks comprising TE set 110J, TE set 110L and TE set 110K, IPPC 127B may be assigned. In at least some embodiments, a collection of virtual network interfaces may be programmatically configured to enable traffic to flow between traffic endpoints (TEs 112, such as 112D, 112E, 112J, 112K, 112P, 112R, 112S, 112V and 112W) in the isolated networks and the FNs of the cell assigned to those isolated networks. Clients on whose behalf the networking applications are being configured may provide decision logic (e.g., a set of rules) and/or policies that can be used to determine the packet processing actions that are to be performed on the packet flows transmitted between the TEs associated with the networking applications. The decision logic may be provided for example via control plane programmatic interfaces of the NFVS in some embodiments. The decision logic received from the clients may be propagated to the ENs of the appropriate IPPCs 127, e.g., from the NFVS API handlers via the ANs 125 or directly in the depicted embodiment. In at least some embodiments, the decision logic initially provided by the clients may be transformed, e.g., by converting high-level information into more specific actions that take into account the identifiers of virtual network interfaces to be used, locality-related information, information about the availability zones in which various FNs are configured, and so on, and the transformed versions may be stored at the different ENs 122 and propagated as needed to the FNs 120.

Flow-level information pertaining to various packet flows received from the TEs 112 at the NFVS may be stored in a collection of data objects referred to as a flow table set at the FNs 120 and at the ENs 122. Each node of the NFVS action implementation layer and decisions layer may maintain its own flow table set in the depicted embodiment. In some embodiments, a given flow table set, such as flow table set 121 at FN 120A or flow table set 123 at EN 122A, may comprise a signature table subdivide into multi-entry buckets, as well as additional tables such as key tables, action tables, and metadata tables as described below in further detail. In at least some embodiments, a given entry in a signature table at an NFVS node (e.g., wither at an FN or at an EN) may comprise a signature of a flow (a shortened representation of a longer key or identifier computed for the flow based on a combination of flow attributes such as source and destination network addresses and ports) as well as an expiration criterion indicating when information pertaining to the flow can be discarded, evicted or overridden. As such, signatures and expiration information may be co-located within individual entries in the signature table in the depicted embodiment. An example expiration criterion may indicate a time-to-live (TTL) for the signature and associated flow-specific information stored in the other flow tables in some embodiments. When a packet of a particular flow is received, the attributes of the particular flow may be mapped to a candidate bucket of the signature table for storing the signature of the flow, e.g., using one or more hash functions in some embodiments. If the candidate bucket happens to contain one or more entries whose expiration criteria have been satisfied, those expired entries may be evicted automatically, without receiving an explicit request to do so, and without obtaining an indication or notification that the packet flows whose signatures were stored in the entries have terminated or ended. Information stored in corresponding entries of the other tables of the flow table set may also be evicted or invalidated. The evicted or freed-up entries in the candidate bucket may then be utilized for storing information about other flows whose packets are received at the NFVS node.

A given packet from a source endpoint such as TE 112K of TE set 110A may be received at a particular FN such as 120C in the depicted embodiment. The specific FN to be used may be selected based, for example, on a shuffle-sharding algorithm in some embodiments, such that packets of a particular flow from a particular endpoint are directed to one of a subset of the FNs of the cell. As indicated above, individual ones of the FNs may comprise or have access to a respective flow table set 121 (e.g., flow table set 121 of FN 120A) comprising an action table in addition to a signature table in various embodiments. An action table may also be referred to as an action cache. Actions may be stored in executable form in the action caches in some embodiments, e.g., using byte code expressed using instructions of a register-based virtual machine optimized for implementing network processing operations. In some implementation, a representation of a routing action for a given flow may simply comprise an IP address which is to be used as the destination address for packets of the flow that are received at the NFVS.

FN 120C may try to look up a representation of an action for the received packet in its action table. The lookup procedure may include the use of the signature table, as discussed below in further detail. If such an action is found via the lookup procedure, the packet may be processed using a "fast path" 166 in the depicted embodiment. For example, an executable version of the action may be implemented at FN 120C, resulting in the transmission of the contents of the packet on a path towards one or more destination endpoints, such as TE 112E in TE set 110B. The path may include zero or more additional FNs—e.g., as shown using arrows 161 and 162, the contents of the packet may be transmitted via FN 120B to TE 112E in the depicted fast packet path. FN 220B may have a virtual network interface configured to access TE 112E, for example, while FN 120C may not have such a virtual network interface configured, thus resulting in the transmission of the packet's contents via FN 220B. Note that at least in some embodiments, one or more header values of the packet may be modified by the action (e.g., in scenarios in which overlapping private address ranges happen to be used at the source and destination isolated networks)—that is, the packet eventually received at the destination endpoint 112E may differ in one or more header values from the packet submitted from the source endpoint 112K. The path between TE 112K and TE 112E may be referred to as a "fast path" because it is traversed via only a single layer (the action implementation layer) of the NFVS, instead of requiring operations to be performed at the decisions layer as well.

If an FN's local action table or cache does not contain an action for a received packet, a somewhat longer workflow may ensue. Thus, for example, if a packet is received from TE 112P at FN 120M (as indicated via arrow 167), and a cache miss occurs in FN 120M's local cache when a lookup is attempted for the received packet, FN 120M may send an action query to a selected EN (EN 122D) in its IPPC 127B, as indicated by arrow 168. The EN 122D may determine, e.g., based on a client-supplied policy indicating that a multicast operation is to be performed, and/or based on forwarding/routing metadata provided by the client, that the contents of the packet are to be transmitted to a pair of endpoints 112R and 112V in the depicted example. Per-flow information for the flow to which the packet received from TE 112P, including a flow signature, expiration criterion etc. may be stored at a flow table set maintained at EN 122D in some embodiments. If needed, expired entries may be identified within a signature table at EN 122D and evicted from all the flow tables including the signature table in various embodiments, without receiving explicit eviction requests or indications that the flows whose signatures are stored in the entries have concluded or terminated.

A representation of an action that accomplishes such a multicasting operation may be sent back to FN 120M, stored in its local action table or cache, and executed at FN 120M, resulting in the transmissions illustrated by arrows 169 and 170. If needed, expired entries in the flow tables, identified using expiration criteria indicated in the signature tables, may be evicted at the FN in at least some embodiments. Note that one or more of the parameters associated with the management of flow table sets, such as the maximum number of buckets per table, the number of entries per bucket, and/or the expiration criteria used for entry eviction decisions, may differ between the layers of the NFVS. For example, in one implementation, a larger signature table may be configured in a flow table set 123 of an EN than the signature table configured in a flow table set 121 of an FN, or a different expiration criterion may be used for entries in an EN flow table set than is used for entries in an FN flow table set. In the example shown in FIG. 1, FN 120M can send outbound packets directly to the destination TEs 112R and 112V, and may not need to use a path that includes other FNs of IPPC 127B. Because the transmission of the packet originating at TE 112P to its destination endpoints required operations to be performed at EN 122D, this type of transmission may be referred to as a slow-path or exception path, in contrast to the fast path discussed above for the packet originating at TE 112K.

As the traffic associated with the applications flows via the IPPCs 127, their respective ANs may collect various types of metrics. Based at least partly on the metrics, as and when needed, additional FNs, ENs (or even ANs) may be instantiated in various embodiments. At least in some embodiments, different IPPCs may have differing initial configurations—e.g., some IPPCs may start out with 10 FNs and 3 ENs, others with 20 FNs and 7 ENs, and so on. If the total workload being handled by the current set of IPPCs exceeds a threshold, new IPPCs may be instantiated and assigned to new application instances (or, via application migration, to existing application instances) in some embodiments. Similarly, if the overall workload falls below a threshold, or the resource utilization metrics of one or more IPPCs falls below some threshold, selected IPPCs (or individual nodes within selected IPPCs) may be decommissioned in various embodiments. Some application instances may potentially generate more traffic than can be handled by the maximum capacity that be provisioned by a given IPPC—in such scenarios, multiple IPPCs may be used in at least one embodiment for a given application instance.

A given IPPC 127 of the NFVS 102 may be referred to in some embodiments as being "isolated" because, at least during normal operating conditions, no data plane network traffic may be expected to flow from that cell to any other cell of the service as indicated earlier. In at least one embodiment, control plane traffic may also not flow across cell boundaries under normal operating conditions. As a result of such isolation, a number of benefits may be obtained: e.g., (a) an increase in a workload of one instance of a packet processing application, being implemented using one cell, may have no impact on the resources being used for other applications at other cells, and (b) in the rare event that a failure occurs within a given cell, that failure may not be expected to have any impact on applications to which other cells have been assigned. Software updates may be applied to nodes of one cell at a time, so any bugs potentially introduced from such updates may not affect applications using other cells. The specific type of packet processing being performed may vary from one application to another, and as a result from one IPPC 127 to another in at least some embodiments. In some embodiments, a given IPPC 127 may potentially be employed in a multi-tenant mode for multiple applications on behalf of respective customers. In at least some embodiments, nodes of the NFVS may generate and run highly efficient executable actions to implement the application-specific packet processing logic based on customer-supplied policies, e.g., using a virtual machine instruction set optimized for networking-related operations.

In at least some embodiments, a shuffle sharding algorithm may be used to assign a subset of nodes (e.g., FNs) of an IPPC 127 to a given set of one or more source or destination endpoints of a given application. According to such an algorithm, if the IPPC comprises N FNs, packets from a given source endpoint E1 may be directed (e.g., based on hashing of packet header values) to one of a subset S1 of K FNs (K<N), and packets from another source endpoint E2 may be directed to another subset S2 of K FNs, where the maximum overlap among S1 and S2 is limited to L common FNs. Similar parameters may be used for connectivity for outbound packets to destination endpoints from the packet processing service in various embodiments. Such shuffle sharding techniques may combine the advantages of hashing based load balancing with higher availability for the traffic of individual ones of the source and destination endpoints in at least some embodiments.

Figure 2:
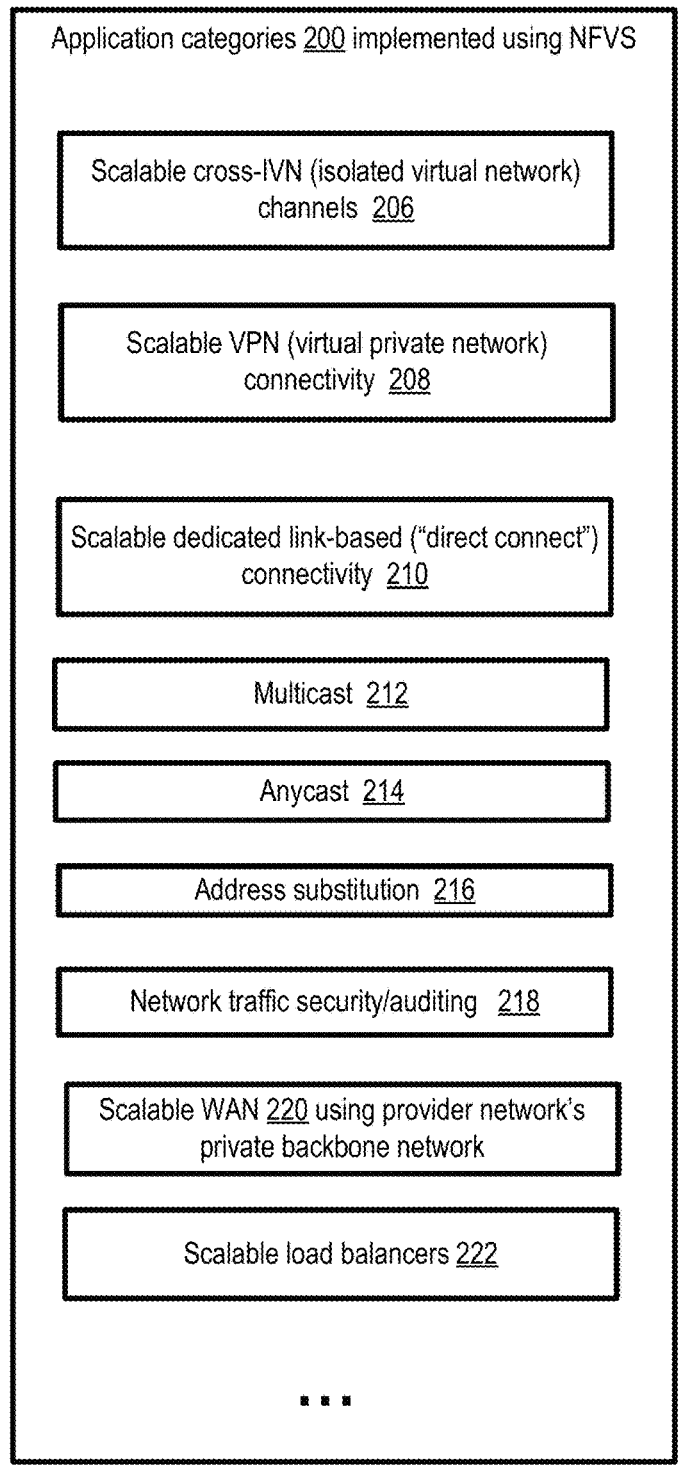
FIG. 2 illustrates example categories of applications that may be implemented at a network function virtualization service, according to at least some embodiments.

FIG. 2 illustrates example categories of applications that may be implemented at a network function virtualization service, according to at least some embodiments. In general, an NFVS with capabilities similar to that of the NFVS 102 shown in FIG. 1 may be configurable to implement any desired type of packet processing or transformations (or combinations of different types of packet processing or transformations), such as processing/transformations for application categories 200 shown in FIG. 2, with nodes being assignable dynamically at each layer to support a large range of traffic rates in a transparent and scalable manner.

At some provider networks, isolated virtual networks (also referred to as virtual private clouds or VPCs) may be set up on behalf of clients. An isolated virtual network (IVN) may comprise a collection of networked resources (including, for example, compute instances such as virtual machines of a virtualized computing service) allocated to a given client, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for virtual machines may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. An NFVS may be utilized in some embodiments to implement scalable cross-IVN channels 206. In such embodiments, the NFVS may in effect act as an intermediary between the private address spaces of two or more different IVNs.

In at least one embodiment, an NFVS may be used to support scalable VPN (Virtual Private Network) connectivity 208 between some set of resources within a provider network and one or more client networks or client premises outside the provider network, or between multiple client-premises networks each linked via VPN connections to the NFVS. In some embodiments, a provider network may support connectivity with external networks via dedicated physical links called "direct connect" links. Applications which implement scalable dedicated link-based connectivity 210 between such external networks (and between such external networks and IVNs or VPN-connected external networks) may be managed using the NFVS in various embodiments.

Multicast 212 is a networking technique, implementable using an NFVS in some embodiments, in which contents (e.g., the body) of a single packet sent from a source are replicated to multiple destinations of a specified multicast group. In contrast, anycast 214 may involve selecting, for all the packets of a given flow that are received at an NFVS, a particular destination from among a specified set of destinations.

Address substitution applications 216, as the name suggests, may involve replacing, for the packets of a particular flow, the source address and port in a consistent manner. Source address substitution techniques may be useful, for example, when an overlap exists between the private address ranges of two or more isolated networks, or when the actual addresses of one or more servers implementing a service using a load balancer are to be hidden from service consumers, and the NFVS may be employed as the intermediary responsible for such substitutions in some embodiments. Such address substitution operations may also be referred to as "managed network address translation (NAT)" in some embodiments.

According to some embodiments, applications implementing techniques for network traffic security/auditing 218 (such as intrusion detection, attack detection, infiltration/exfiltration detection etc.) may be implemented using an NFVS. In at least one embodiment, scalable wide area networks 220 that utilize a provider network's private backbone network may be implemented using an NFVS. Scalable load balancers 222 may represent another category of application implemented with the help of an NFVS in one embodiment. Other categories of packet processing applications and network functions may be supported using the NFVS in different embodiments than those shown in FIG. 2, while some of the types of applications indicated in FIG. 2 may not be supported in some embodiments. For some or all of the categories of applications indicated in FIG. 2, as well as for other types of applications which may be implemented using an NFVS, per-packet-flow information may be stored at a set of flow tables, and eviction of entries from such tables may be performed using the kinds of techniques introduced above.

Figure 3:
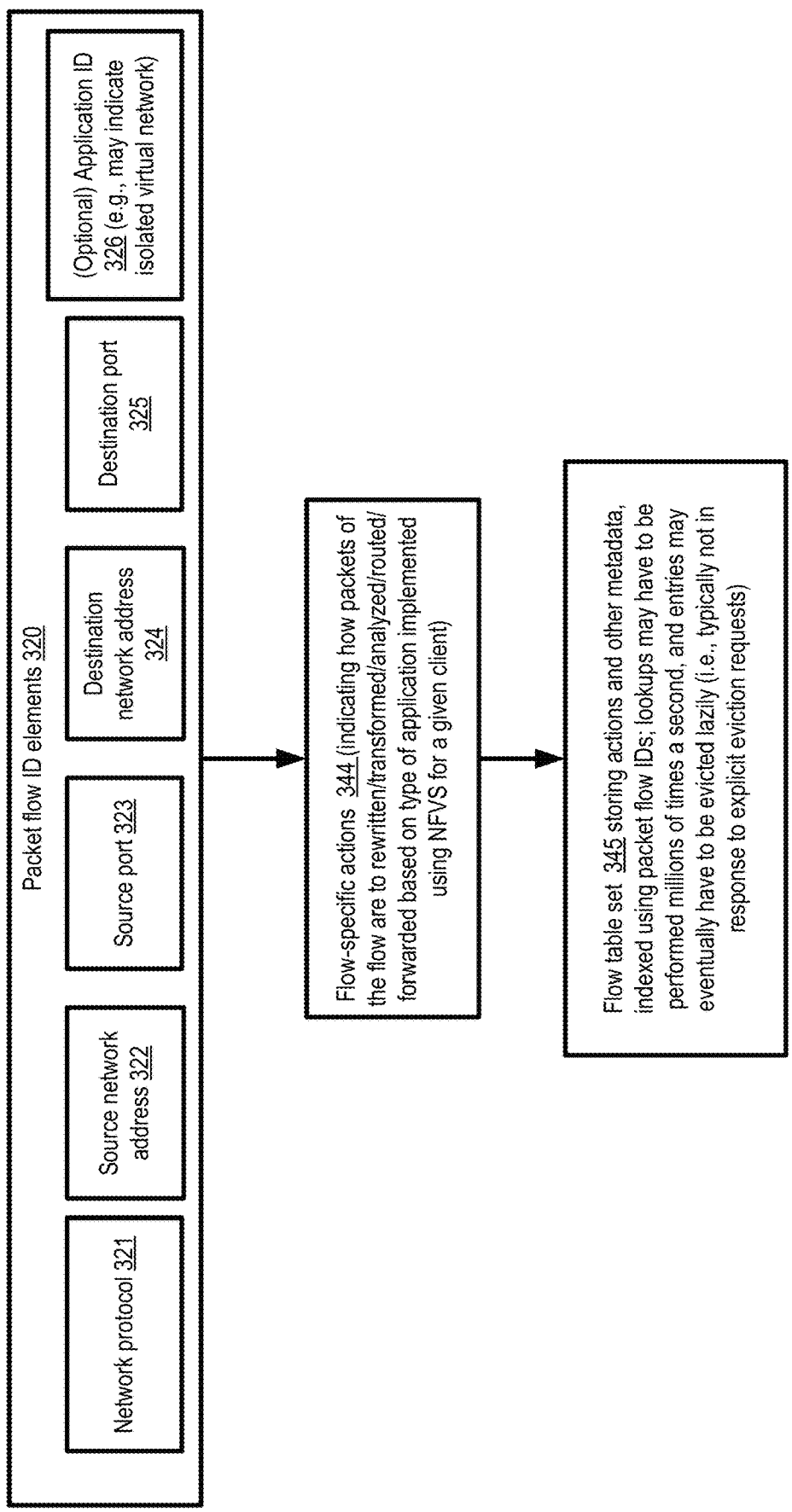
FIG. 3 illustrates elements of packet flow identifiers, which may be used to store entries associated with network function actions within a set of flow tables, according to at least some embodiments.

FIG. 3 illustrates elements of packet flow identifiers, which may be used to store entries associated with network function actions within a set of flow tables, according to at least some embodiments. Packet flow identifier elements 320 may include an identifier of a network protocol 321 being used (e.g., Transmission Control Protocol (TCP), User Datagram Protocol (UDP), an encapsulation protocol used for transmitting packets between compute instances of a virtualized computing service, and so on), a source network address 322, a source port 323, a destination network address 324, a destination port 325, and an optional application identifier 326 which may for example indicate an identifier of an isolated virtual network (IVN) from which or to which the packets of the flow are directed in the depicted embodiment. The packet flow ID elements 320 may also be referred to as flow attributes, and the combination of the flow ID elements 320 may distinguish packet flows from one another. In some embodiments, the packet flow ID elements may be combined or concatenated to compute a unique per-flow key which is stored along with other information in the flow tables maintained at NFVS nodes.

For each packet flow processed at an NFVS, a respective flow-specific action which is to be performed for individual packets of the flow may be identified in the depicted embodiment, e.g., based on logic or rules provided by an NFVS client. Flow-specific actions 344, indicating how packets of the flow are to be rewritten or transformed (e.g., by changing packet header entries and/or modifying the packet body contents), analyzed (e.g., to detect potential security attacks), routed or forwarded may be generated, for example at NFVS exception-path nodes in various embodiments. The actions and other metadata associated with the flow, including signatures, expiration criteria and the like may be stored within a flow table set 345 at individual ones of the NFVS nodes selected for processing the flow in various embodiments. The objects included within the flow table set may be indexed using packet flow identifier elements in at least some embodiments. At large-scale NFVSs, lookups may have to be performed in the flow table sets millions of times a second. Entries stored in the flow table sets may eventually have to be evicted lazily, i.e., typically without receiving explicit eviction requests or explicit indications that no more packets of a given flow are going to be transmitted to the NFVS.

Figure 4:
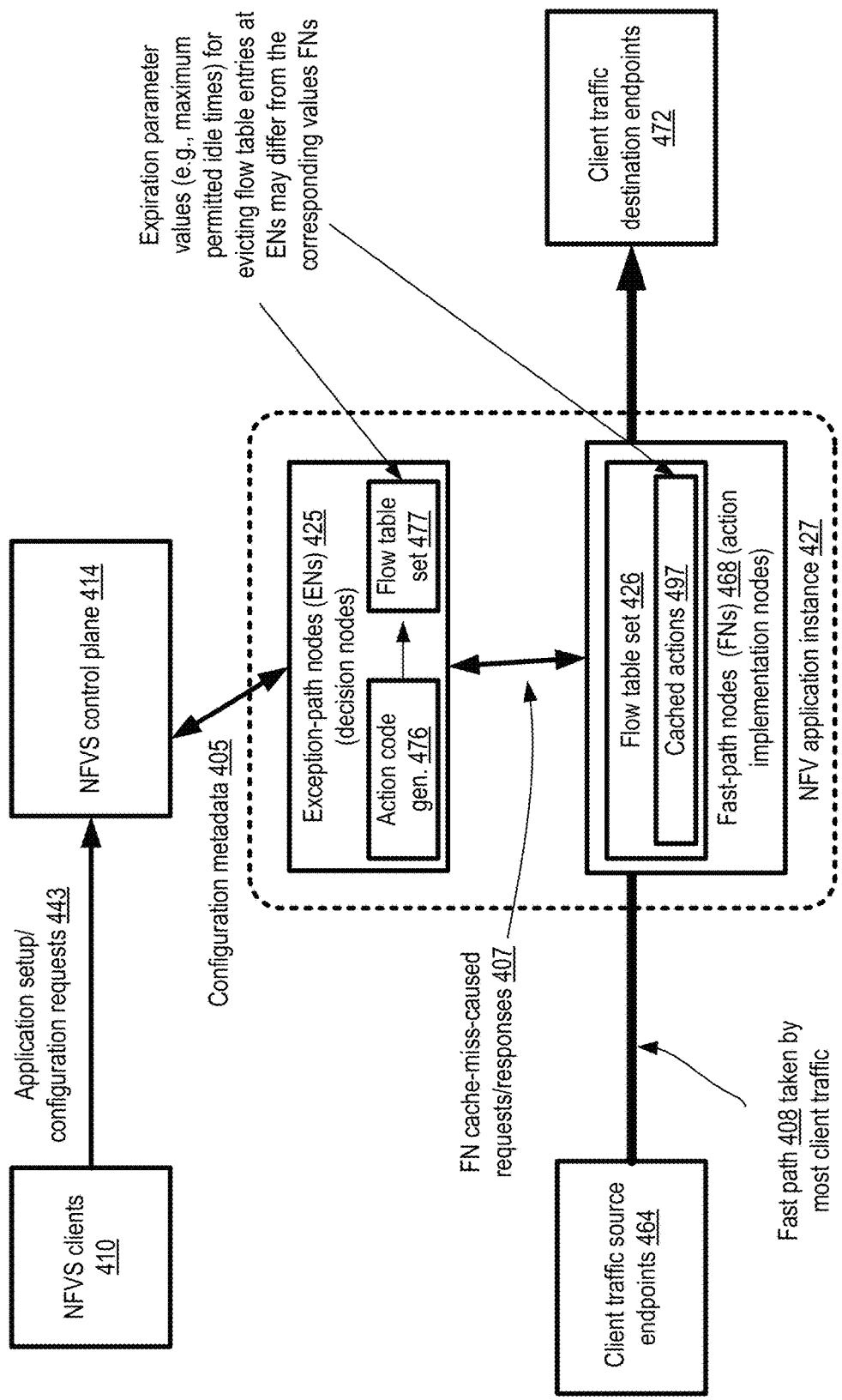
FIG. 4 illustrates an example overview of fast-path and slower-path operations at a network function virtualization service, according to at least some embodiments.

FIG. 4 illustrates an example overview of fast-path and exception-path operations at a network function virtualization service, according to at least some embodiments. In the depicted embodiment, data plane components of a network function virtualization (NFV) application instance include a respective collection of fast-path nodes (FNs) 468 (also referred to as action implementation nodes), and exception-path nodes (ENs) 425 (also referred to as decision nodes). An NFVS client 410 such as an application vendor may submit requests 443 to the NFVS control plane 414 to set up instances of one or more applications, which may be exposed to end users in the form of virtual appliances in the depicted embodiment.

A given FN 468 may store cached actions 497 comprising representations of the rules, actions and/or programs of the application logic to be implemented at the node are stored. The cached actions may, for example, be included within one or more objects of a flow table set 426, such as an action table. The flow table set may also include other objects such as a signature table, a key table, and a metadata table as discussed below in some embodiments. The actions to be performed may be stored in executable form in the caches in some embodiments, e.g., as byte code expressed using instructions of a register-based virtual machine optimized for implementing network processing operations, which can be used to perform operations similar to those of the extended Berkeley Packet Filter (eBPF) interface. In one implementation, for example, an eBPF program may be restricted in several ways—the maximum number of instructions may be limited, only a few 64-bit registers may be available, only forward conditional jumps may be supported, and so on. As a result of the restrictions, the pipeline logic expressed as an eBPF program may be executed very quickly, but the complexity of the work that can be accomplished using a given program may be limited. For at least some stages of an NFV application, the application vendor may supply the program code to be used and cached in the depicted embodiment.

Configuration metadata 405 about the application (comprising, for example, indications of the vendor-defined operations to be performed) may be transmitted from the NFVS control plane 414 to the ENs 425, and commands to administer (e.g., monitor the health of) the application instance 427 may be transmitted to one or more administration agents instantiated by the control plane 414. When a network packet of a given flow is received from a client traffic source traffic endpoint 464 at an FN 468, the local cache of actions may be examined to determine whether code to process the packet is present in the cache. If a cache hit occurs, i.e. if appropriate code is found, the code may be executed, and one or more packets (which may be rewritten versions of the received packet) may be sent to a client traffic destination traffic endpoint 472 along the fast path 408. If a cache miss occurs, a request 407 may be sent to the ENs 425 from the FNs 468. In some embodiments, the ENs 425 may then provide the code (generated using configuration metadata 405 by an action code generator 476, and also stored in the EN's own flow table set 477) to process the packet to the FN, where the code may be cached for use with subsequent packets of the same flow. Depending on the results of the processing performed at the FPPNs and/or based on IVN configuration settings, some received packets may simply be discarded or dropped in the depicted embodiment; as such, the actions taken with respect to a given packet may not necessarily include sending a corresponding packet from the SPPS towards a destination. For example, a packet received from a traffic origin may be dropped if a determination is made that the packet is part of a network attack or data exfiltration effort, or if configuration settings of an IVN prohibit packets from that traffic origin to be transmitted to a targeted destination indicated in the received packet, and so on.

In various embodiments, expiration criteria for removing/evicting entries in the flow tables may be stored in the flow tables themselves, e.g., in a signature table in which shortened representations of flow identifiers are also stored. An expiration criterion may, for example, indicate a point in time after which the entries for a given packet flow are to be evicted in one embodiment. The point in time may be set based on a maximum permissible "idle time" for the packet flow, where a flow is considered "idle" over a time period if no packet of the flow has been received during that time period. So, for example, whenever a packet of a flow PF1 is received at an FN or an EN (indicating that the flow is active rather than idle), the point in time at which the entries for the flow PF1 are to be considered expired may be adjusted further in the future. If a packet of PF1 is received at 09:00:00 AM at a node of the NFVS, and the expiration criterion used at that node is that at least 30 seconds have to elapse without any new packet for the entries of PF1 to be considered expired, the expiration time of PF1 may be set to 09:00:30 (30 seconds in the future). If another packet of PF1 is received at 09:00:20, the expiration time may be modified to 09:00:50, and so on. Note that at least in some embodiments, expiration-related parameter values (such as the 30 second maximum permitted idle time in the above example) may differ at the ENs from the parameter values used for the same flow at the FNs.

Figure 5:
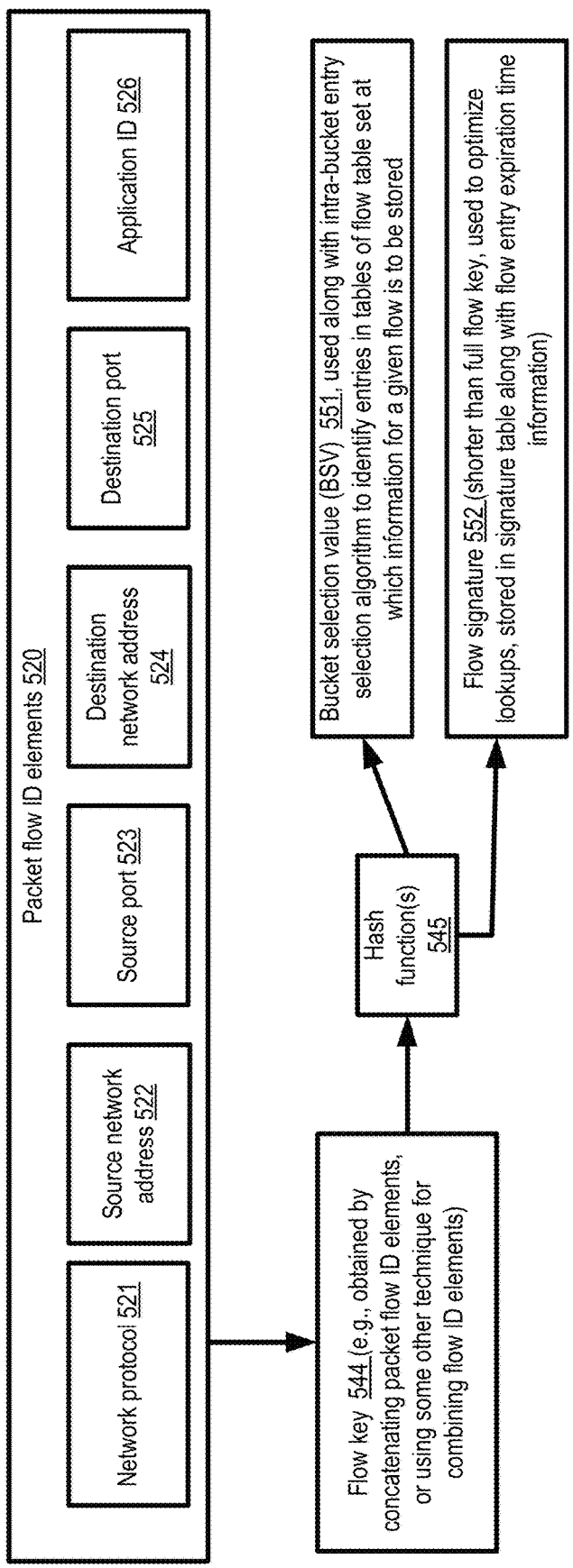
FIG. 5 illustrates an example generation of flow keys, flow table bucket selection values, and flow signature values from packet flow identifier elements, according to at least some embodiments.

FIG. 5 illustrates an example generation of flow keys, flow table bucket selection values, and flow signature values from packet flow identifier elements, according to at least some embodiments. In the embodiment shown in FIG. 5, a flow key 544 may be generated from the packet flow ID elements 520 such as the network protocol 521, source network address 522, source port 523, destination network address 524, destination port 525 and application identifier 526. The flow key 544 may be constructed in some embodiments by concatenating the elements of the flow ID in a selected order. In other embodiments, the flow key may be generated from a combination of at least some of the elements of the flow ID using some other technique. The flow key 544 of a packet flow uniquely identify the packet flow in at least some embodiments; that is, the flow key of the given packet flow would differ from the flow key of any other packet flow.

One or more hash functions 545 may be applied to the flow key in the depicted embodiment to obtain a bucket selection value (BSV) and/or a flow signature 552. The BSV 551 may be used, along with an intra-bucket entry selection algorithm, to identify the specific entries or positions within the tables of a flow table set at which information (including the flow signature and an expiration criterion) pertaining to a given flow are to be stored. The flow signature 552 may represent a shortened version of the flow key 544 or identifier of the flow in various embodiments. For example, in an implementation in which 256 bits are used for the flow key, 32 bit signatures may be used. One benefit of using shortened versions of the flow identifiers/keys is that the speed at which lookups for existing flow information (such as the packet processing action to be performed for a packet of a flow) can be conducted is higher than if the full keys were used for all phases of the lookup. If none of the entries in a particular bucket of a signature table contain the signature of a flow NF1 to which a newly-received packet P1 belongs, in at least some embodiments this may imply that information about NF1 is not present in the flow table set. Note that because the signatures take up fewer bits than the keys, it may be the case that a given signature may correspond to two or more flows being processed at the NFVS concurrently (although the probability of this is low). In a scenario in which a matching signature is found in an entry EST1 in the signature table for a given packet P1 of a flow NF1, the full flow key 544 for NF1 may be compared to the key stored in a corresponding entry EKT1 in a key table in various embodiments to ensure that the action which is performed on P1 is the right one.

In some embodiments, different hash function(s) may be applied to the flow key 544 to generate the BSV than the hash function(s) applied to generate the flow signatures. In other embodiments, the same hash function(s) may be applied for generating both the BSV and the flow signature. For example, if a hash function H is applied to a flow key Key1 in an implementation in which a signature table contains N buckets to generate both the BSV and the signature, the signature may be set to H(Key1), while the BSV may be set to H(Key1) modulo N. IN contrast, in a scenario in which a hash function H1 is used for the signature and a different hash function H2 is used for the BSV, the signature may be computed as H1(Key1), and the BSV may be computed as H2(Key1) modulo N.

Within a given bucket of a signature table, when searching for an entry corresponding to a flow NF1, different intra-bucket entry selection algorithms may be employed in respective embodiments. In one embodiment, the search for a matching entry may always be conducted sequentially, starting from the first entry. In another embodiment, a pseudo-random number generator may be used to pick a starting point or index within the bucket for the search, and the search may be conducted starting at that index, moving to the end of the bucket and rolling over to the start of the bucket if needed. In some embodiments, signatures may be stored in a given bucket in increasing or decreasing numerical order, and a binary search algorithm may be used. In at least one embodiment, a parallel search may be conducted within the bucket, using two or more threads that search respective portions of the bucket. Any of these types of intra-bucket entry selection algorithms may also be used to traverse the buckets to search for empty entries into which new flow signatures can be placed in at least some embodiments. As discussed earlier, during such traversals, expired entries may be identified and evicted in various embodiments.

Figure 6:
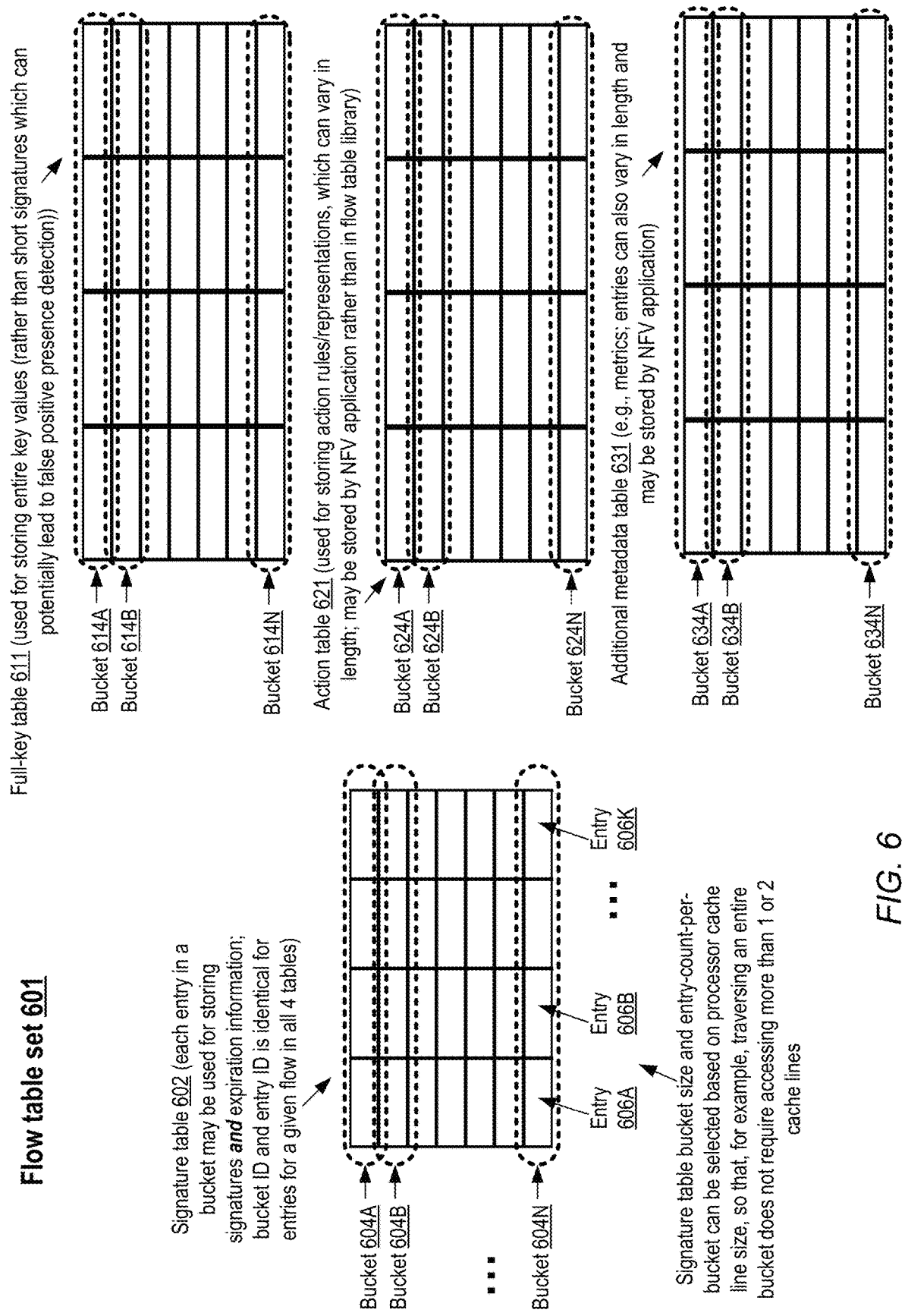
FIG. 6 illustrates an example flow table set comprising a signature table, a full-key table, an action table and a table for additional metadata, according to at least some embodiments.

FIG. 6 illustrates an example flow table set comprising a signature table, a full-key table, an action table and a table for additional metadata, according to at least some embodiments. Each of the constituent data objects of the flow table set may comprise multiple buckets, with multiple entries per bucket used to store flow-specific information used to implement network function virtualization or packet processing tasks.

Signature table 602 of flow table set 601 comprises a plurality of buckets 604, such as bucket 604A, bucket 604B, and bucket 604N in the depicted embodiment. Each bucket 604 contains several entries (some of which may be empty or unused at a given point in time), such as entries 606A, 606B, and 606K. Each in-use entry of signature table 602 may store a flow signature as well as a representation of an expiration criterion for the information (stored in the signature table as well as other tables of the flow table set 601) pertaining to the flow represented by the signature in the depicted embodiment. In at least some implementations, the signature table bucket size (the total number of bytes to be used for a given bucket) and/or the number of entries to be included per bucket may be selected based at least in part on a hardware cache line size (e.g., an L1, L2 or L3 cache line size) of a cache of the processors used for the NFVS nodes, so that (for example) all the entries of a given bucket can fit into a single cache line or a few cache lines.

A full-key table 611, also organized into multi-entry buckets, may be included in flow table set 601 in the depicted embodiment. The full-key table 611 entries may store the entire flow keys (instead of the shortened versions of the keys which are stored in the signature table), and may be used to verify that a match in the signature table was not a false positive (since the same signature may potentially be generated for two different full keys) in various embodiments.

Representations of the packet processing actions to be performed for the packets of different flows may be stored in action table 621 in some embodiments. Additional metadata pertaining to individual ones of the flows (e.g., metrics such as processed packet counts, etc., associated with the flows) may be stored in additional metadata table 631 in the depicted embodiment. The amount of data (the number of bytes used) for storing actions and additional metadata may vary from one packet flow to another in at least some embodiments.

In at least some embodiments, the dimensionalities (number of buckets, number of entries within buckets) of all the tables of the flow table set may be same—each table may have N buckets with K entries per bucket, for example. Thus, full-key table comprises buckets 614A, 614B, . . . 614N with K entries each, action table 621 comprises buckets 624A, 624B, . . . 624N with K entries each, and additional metadata table 631 comprises buckets 634A, 634B, . . . 634N with K entries each in the example shown in FIG. 6. In various embodiments, the bucket ID and intra-bucket entry ID of the entry used for storing information pertaining to a given flow may be the same in all four tables of the flow table set 601. For example, if the signature and expiration criterion for a flow NF1 is stored in the $2^{nd}$ entry of the third bucket of signature table 602, the full key of NF1 may be stored in the $2^{nd}$ entry of the third bucket of full-key table 611, the action to be implemented for packets of NF1 may be stored in the $2^{nd}$ entry of the third bucket of action table 621, and additional metadata pertaining to NF1 may be stored in the $2^{nd}$ entry of the third bucket of additional metadata table 631. In such embodiments, once the bucket identifier and intra-bucket entry identifier for a given flow in the signature table has been determined, the locations of additional information pertaining to the same flow in the other tables is also known. In other embodiments, different techniques may be used to link the information for a given flow in the different tables of flow table set 601. For example, a pointer in the form of a bucket index and an entry index may be stored in an entry of the full-key table to indicate where the action representation for the flow is within the action table, and so on. In at least one embodiment, one or more of the tables of a flow table set 601 (such as the signature table and/or the full-key table may be stored and managed as part of a low-level network function processing library, while other tables of the flow table set (such as the action table and/or the additional metadata table) may be stored and managed at an application level within the software stack employed at an NFVS node. Buckets in the various data objects of a flow table set (such as the signature table, the full-key table, the action table or the additional metadata table) may also be referred to as entry groups, as each bucket comprises a group of one or more entries. In at least some embodiments, some entries in a given table of a flow table set may differ in length (number of bytes or bits) from other entries stored in the same table. For example, action table entries may vary in length depending on the complexity of the actions being performed for different applications or for different flows of the same application.

According to some embodiments, some of the components of a flow table set may be implemented using different types of data structures than others. In one embodiment, while the signature table is organized as a two-dimensional data structure (with one dimension corresponding to the buckets, and the second dimension corresponding to entries within buckets), one or more of the remaining components may be implemented as one-dimensional or "flat" arrays. For example, full keys may be stored in a flat array whose length (number of entries) is the product of the number of buckets and the number of entries of the signature table, action representations may be stored at a flat array, and/or the additional metadata may be stored as a flat array in various embodiments. The location, within such a flat array, of the information pertaining to a given flow NF1 may be determined based on the bucket identifier (B) of the bucket in which information for NF1 is stored in the signature table, and the intra-bucket entry identifier (E) of the entry in the signature table in which the NF1 information is stored. In one implementation, in a flat array, the index of the information pertaining to NF1 may be computed as ((B×K)+E), where K is the number of entries per bucket of the signature table. Data structures other than flat arrays may be used for some components of the flow table set in some embodiments. In some embodiments, data structures other than two-dimensional tables may be used for all the flow information—e.g., including signatures and co-located expiration information. Note that if the expiration information were to be stored in a separate data structure than the signatures, the number of data accesses (of the signature data structure and the expiration information data structure) required to identify expired entries of packet flow information may increase substantially relative to the number of data accesses required in the approach introduced herein, potentially resulting substantially slower packet processing.

Figure 7:
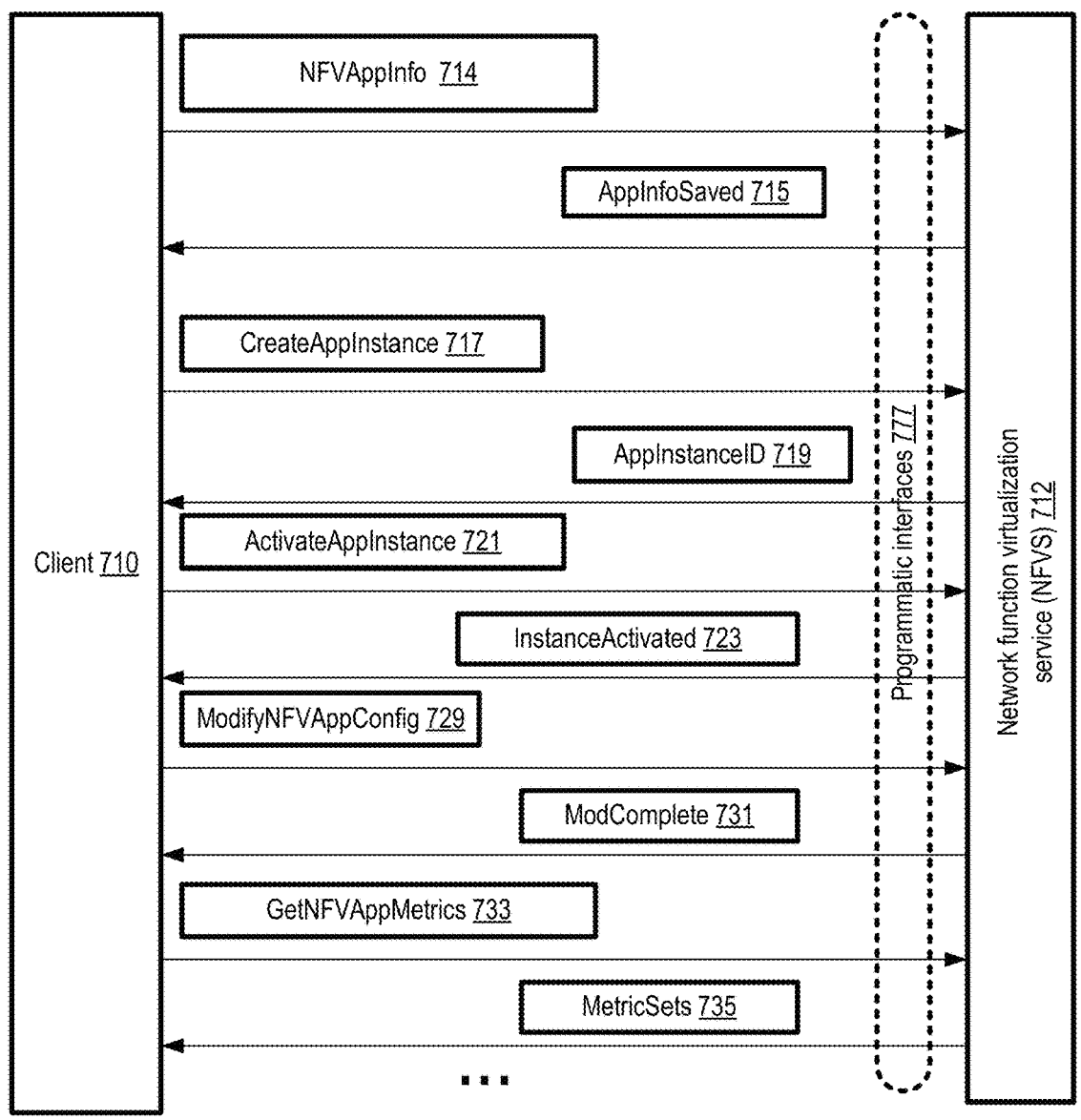
FIG. 7 illustrates example programmatic interactions between clients and a network function virtualization service, as well as programmatic interfaces of a flow table library which may be utilized for network function virtualization applications, according to at least some embodiments.
Figure 7:
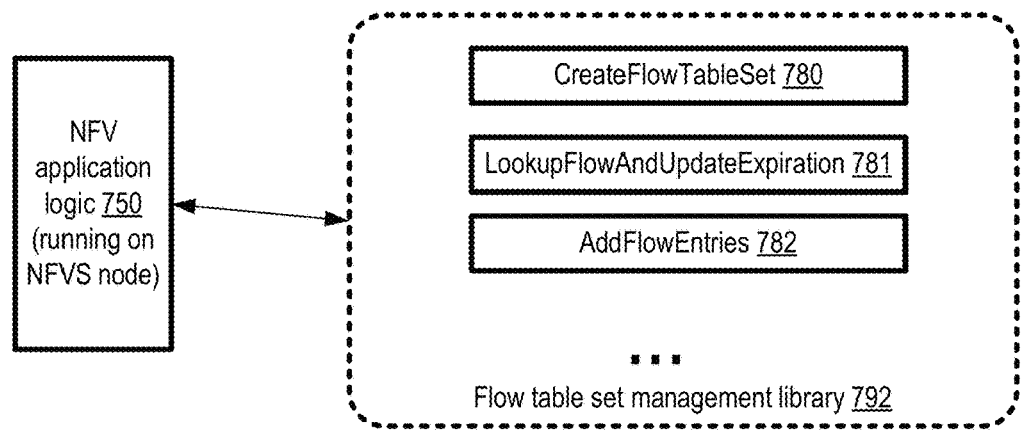

FIG. 7 illustrates example programmatic interactions between clients and a network function virtualization service as well as programmatic interfaces of a flow table library which may be utilized for network function virtualization applications, according to at least some embodiments. In the embodiment shown in FIG. 7, an NFVS 712, similar in features and functionality to NFVS 102 of FIG. 1, may implement one or more programmatic interfaces 777, such as a web-based console, graphical user interface, command-line tools, or a set of application programming interfaces (APIs). Clients 710 of the NFVS 712, such as the designers/developers of packet processing applications, may submit various types of messages and/or requests via the programmatic interfaces 777 pertaining to various aspects of packet processing applications, and receive corresponding responses from the NFVS.

A client 710 may, for example, submit an NFVAppInfo message 714, indicating the kind of application (selected for example from among the application categories shown in FIG. 2) which is to be implemented on the client's behalf using NFVS nodes. The information provided by the client (which may for example include logic or rules to be used for packet processing actions, a minimum number of fast-path nodes and exception-path nodes per application instance, etc.) may be stored at a repository of the NFVS, and an AppInfoSaved message 715 may be sent to the client in some embodiments.

In some embodiments, a client 710 may request that an instance of an application be created for a specified set of source and destination network endpoints, e.g., by submitting a CreateAppInstance request 717. A set of fast-path nodes and exception-path nodes may be identified and assigned for implementing the client's application, and an AppInstanceID message 719 comprising an identifier of the application instance may be sent to the client in the depicted embodiment.

An application instance may be activated, i.e., enabled to start processing packets from the endpoints for which the application instance was created, by sending an ActivateAppInstance request 721 in some embodiments. The nodes of the NFVS may begin accepting packets and implementing packet processing actions based on the client's specified logic or rules in response, and an InstanceActivated message 723 may be sent to the client to indicate that the NFVS nodes have been activated in some embodiments.

In some embodiments, a client 710 may desire a change to the configuration of NFVS nodes being used for an application instance, and use a ModifyNFVAppConfig request to indicate the details of the changes—e.g., the client may request that the number of fast-path nodes or exception-path nodes be increased or decreased. The changes requested may be implemented by the NFVS, and a ModComplete response message 731 may be sent to the client in some embodiments.

A variety of metrics pertaining to a client's NFV application instance(s) may be collected in some embodiments at the NFVS nodes, such as the total number of network flows encountered during a time interval, the total number of packets received and processed, the number of action cache misses, the latencies for various packet processing operations, and so on. A client may submit a GetNFVAppMetrics request 733 to view such metrics for a specified application or a specified application instance in various embodiments, and the requested metrics may be provided to the client using one or more MetricSets messages 735.

In at least some embodiments, a flow table set management library 792 may be implemented as part of the software stack used for one or more types of NFVS nodes. The library 792 may expose a set of APIs which can be used to perform various types of operations pertaining to data objects such as those shown in FIG. 6. NFV application logic 750, running at an application layer of the software stack of an NFVS node, may for example invoke a CreateFlowTableSet API 780 to instantiate one or more of the data objects shown in FIG. 6 in the depicted embodiment. When a packet is received at an NFVS node, a LookupFlowAndUpdateExpiration API 781 may be invoked to determine whether an existing entry is already present in a signature table (and to extend the expiration time of the entry if it is present) for a specified flow in some embodiments. To request the addition of a new signature pertaining to a given flow, and the addition of other information in the other tables of the flow table set, an AddFlowEntries API 782 may be invoked in the depicted embodiment. As mentioned above, during the traversal of a bucket in response to an AddFlowEntries API invocation or in response to a LookupFlowAndUpdateExpiration API invocation, one or more expired entries (if any expired entries are encountered) may be evicted from the signature table (and the other types of tables) in some embodiments, without receiving any explicit request for deletion or eviction. A flow table set management library such as library 792, whose API parameters include expiration information, may represent a novel approach towards managing data pertaining to packet flows, in that programmers using the library may not have to concern themselves about explicit deletion or eviction of entries in the flow table set. In some embodiments, programmatic interactions and library APIs other than those shown in FIG. 7 may be supported at an NFVS. For example, a DeleteFlowEntries API may be supported for explicitly deleting flow table set entries in some embodiments.

FIG. 8 illustrates flow table entry eviction policies which may be implemented at a network function virtualization service, according to at least some embodiments. In some embodiments, after a first packet P1 of a flow PF1 is received at a node of an NFVS and a decision is made to add a signature table entry for that flow (e.g., because a lookup has confirmed that a pre-existing signature table entry for F1 is not present, and there are no empty entries available), at most a single expired entry may be evicted or removed from the signature table (if an expired entry is found). This approach may be referred to as an EvictSingleEntryUponAdd policy 801. The expired entry may then be used to store PF1's signature and PF1's expiration criterion. If no expired entries are found, the packet P1 may be discarded or dropped in some embodiments. Note that when an entry is added to a signature table for a given flow such as PF1, regardless of the table entry eviction policy used, corresponding entries may also be added to one or more of the other data objects that make up the flow table set in various embodiments, such as a full-key table, an action table, and an additional metadata table of the kind shown in FIG. 6. Similarly, when an entry of the signature table is evicted (e.g., by setting a bit, deleting the contents of the entry, or using some other mechanism), corresponding entries of the other data objects of the flow table set may be evicted as well in at least some embodiments.

Instead of evicting only one entry in the signature table (and other data objects of the flow table set) when a decision to add a new entry for PF1 is made, in some embodiments a full traversal of the candidate bucket may be conducted, and all the expired entries found may be evicted. This approach may be labeled as the EvictAllExpiredEntriesInBucketUponAdd policy 804. In at least one embodiment, instead of evicting all expired entries of the bucket, no more than N expired entries may be evicted at a time, where N is greater than 1. This third approach, which may be considered a compromise between the EvictSingleEntryUponAdd and EvictAllExpiredEntriesInBucketUponAdd policies, may be referred to as the EvictUptoNExpiredEntriesInBucketUponAdd policy 807.

In some embodiments, instead of evicting expired entries only after a decision is made at an NFVS node that a new entry has to be added, one or more expired entries may be evicted during lookups. When a packet Pk (not necessarily the first packet of a flow PF1) is received at an NFVS node, and a candidate bucket CB for storing/containing the signature of PF1 is identified, a lookup may be conducted among the entries of CB in various embodiments. The lookup may involve a sequential traversal of the entries, or a parallel traversal using several threads working concurrently in different embodiments. If, during the traversal, a pre-existing entry for PF1 is found, there may be no need to find a new entry to store PF1's signature. Nevertheless, in an effort to proactively create more space for signatures of subsequent new flows, in some embodiments one or more expired entries (up to a maximum of N expired entries) encountered during the traversal for lookup, (prior to finding the entry storing PF1's entry if such an entry exists), may be evicted, e.g., in accordance with an EvictUptoNEntriesInBucketUponLookup policy 810. In some embodiments, an NFVS client on whose behalf an application is being implemented may provide an indication, via the NFVSs' programmatic interfaces, of a preferred eviction policy to be used for entries in the flow table set data objects maintained for the application. In one embodiment, eviction policies other than those shown in FIG. 8 may be employed to select the number of entries, and/or which specific entries, should be evicted from flow table set, and under what circumstances the entries should be evicted.

Figure 9:
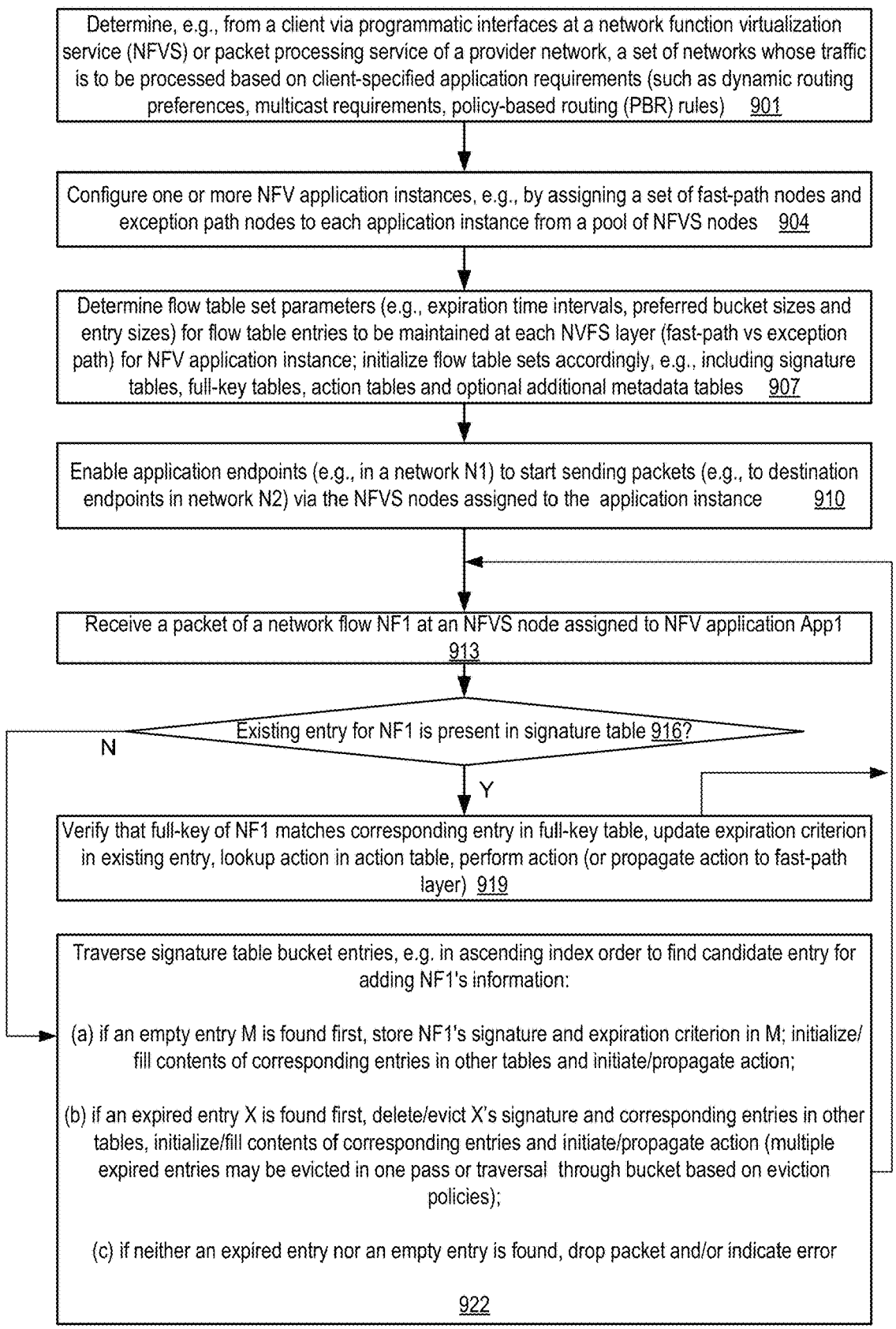
FIG. 9 is a flow diagram illustrating aspects of operations that may be performed to configure and use flow tables at a network function virtualization service, according to at least some embodiments.

FIG. 9 is a flow diagram illustrating aspects of operations that may be performed to configure and use flow tables at a network function virtualization service, according to at least some embodiments. As shown in element 901, a set of networks (e.g., including one or more isolated virtual networks or networks at premises external to a provider network) whose traffic is to be processed at an NFVS or packet processing service of a provider network may be determined, e.g., based on input received from a client via one or more programmatic interfaces. An indication of client-specified requirements (e.g., the category of the application (such as one of the categories indicated in FIG. 2), as well as application details such as dynamic routing preferences, multicast requirements, policy-based routing rules, etc.) for the processing of the packets of the traffic may be supplied by the client in various embodiments via programmatic interfaces similar to interfaces 777 of FIG. 7.

One or more instances of an NFV application may be configured at the NFVS, e.g., by the control plane of the NFVS in some embodiments. An initial set of fast-path nodes and exception-path nodes may for example be assigned to each instance from a pool of such nodes maintained at the NFVS in various embodiments (element 904).

A set of parameters governing various aspects of the flow table sets to be maintained for each application instance at the fast-path layer and the exception-path layer of the NFVS may be determined in the depicted embodiment (element 907). The flow table set parameters may include the number of distinct data objects or tables to be used, such as a signature table to be used for flow signatures (shortened versions of flow keys/identifiers) as well as expiration criteria for information pertaining to the flows, a full-key table, an action table and/or an optional additional metadata table. The flow table set parameters may also include the expiration time intervals (how long a given flow is permitted to remain idle before it is to be designated as expired, where a flow is considered idle during a given time period if no packets of the flow are received at the NFVS) to be used for various flows at the different layers, the bucket or entry group sizes as well as the entry sizes within the buckets in some embodiments. Note that the parameter values for a given parameter (e.g., expiration criteria or intervals, bucket sizes, etc.) may differ between the fast-path layer and the exception-path layer in some embodiments. The flow table sets may be initialized accordingly at each of the layers in the depicted embodiment.

The application instance(s) may then be activated (element 910), enabling application endpoints configured within one of the networks N1 indicated by the client as a source of traffic for the application to start sending packets, via the NFVS nodes assigned to the application instance(s), to application endpoints in a different network N2 indicated by the client as a destination of the traffic.

A packet P1 of network flow NF1 may be received at an NFVS node assigned to an NFV application App1 in the depicted embodiment after App1 is enabled (element 913). A key K1, bucket selection value (BSV1) and signature FS1 of NF1 may be computed at the node in some embodiments. K1 may for example be being generated by combining (e.g., concatenating) flow attributes of NF1 (such as some subset or all of the attributes shown in FIG. 5). BSV1 may be computed for example at least in part by applying a hash function to KL. FS1 may also be computed at least in part in some embodiments by applying a hash function (either the same hash function used for BSV1 or a different hash function). In at least some embodiments, the number of bits used for storing FS1 may be smaller than the number of bits used for K1; as such, FS1 may be considered a shortened version of an identifier of NF1.

A lookup or search for an entry containing FS1 may be conducted within the signature table bucket B1 identified using BSV1 as the candidate bucket for containing NF1's signature. If an existing entry E1 containing NF1's signature FS1 is present (as determined in operations corresponding to element 916) in B1, the following operations may be performed in at least some embodiments. A program running at the NFVS node may verify that the full-key K1 of NF1 matches the contents of a corresponding entry (an entry identified using the entry identifier of E1, and the bucket identifier of B1) in a full-key table (element 919). An expiration criterion (e.g., a time after which the flow NF1 is to be designated as expired unless one or more addition packets of NF1 are received in the interim) may be updated in E1 in at least some embodiments. A packet processing action, indicated for example in an action table element indexed by B1's bucket identifier and E1's entry identifier may be looked up for P1 in various embodiments (or generated based on the client's application requirements if the NFVS node is an exception-path node and the action table does not currently store a representation of the action to be performed for NF1 packets). If the node at which the action is identified is a fast-path node, the action may be performed in various embodiments at the node; otherwise the representation of the action may be propagated to the appropriate fast-path node from the exception-path node.

If an existing entry E1 for NF1 is not present in bucket B1 of the signature table (as also determined in operations corresponding to element 916), the entries within B1 may be traversed, e.g., in ascending index order (or in some other order) to try to find a suitable candidate entry for storing NF1's signature and expiration criterion in the depicted embodiment (element 922). Other bucket traversal techniques, such as starting the traversal from a randomly-selected index, or parallel traversal, may be used in other embodiments. If an empty (e.g., previously-evicted, or never-used) entry M is found first during the traversal, NF1's signature FS1 and expiration criterion may be stored in M in some embodiments, contents of corresponding entries in other tables of the flow table set may be initialized or filled, and the action to be undertaken for P1 may be initiated or propagated. If an expired entry X is found first during the traversal, X may be evicted (e.g., the signature and expiration criterion stored in X may be deleted/overwritten to store PF1's information). In addition, entries corresponding to X in the other flow table set objects may also be evicted in at least some embodiments. The action to be performed for P1 may then be performed or propagated in various embodiments. In at least one embodiment, as discussed in the context of FIG. 8, multiple expired entries within the signature table may be evicted in a single pass, e.g., by storing a respective indication (such as a flag or a bit) that each of the expired entries which was in use earlier is now available for re-use. If neither an expired entry nor an empty entry is found in B1, the received packet P1 may be dropped or the occurrence of an error may be indicated (e.g., by storing an error message in a log or via a notification to an administrator of the NFVS) in some embodiments. Operations corresponding to elements 913 onwards may be repeated for each packet received at the NFVS in various embodiments.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Figure 10:
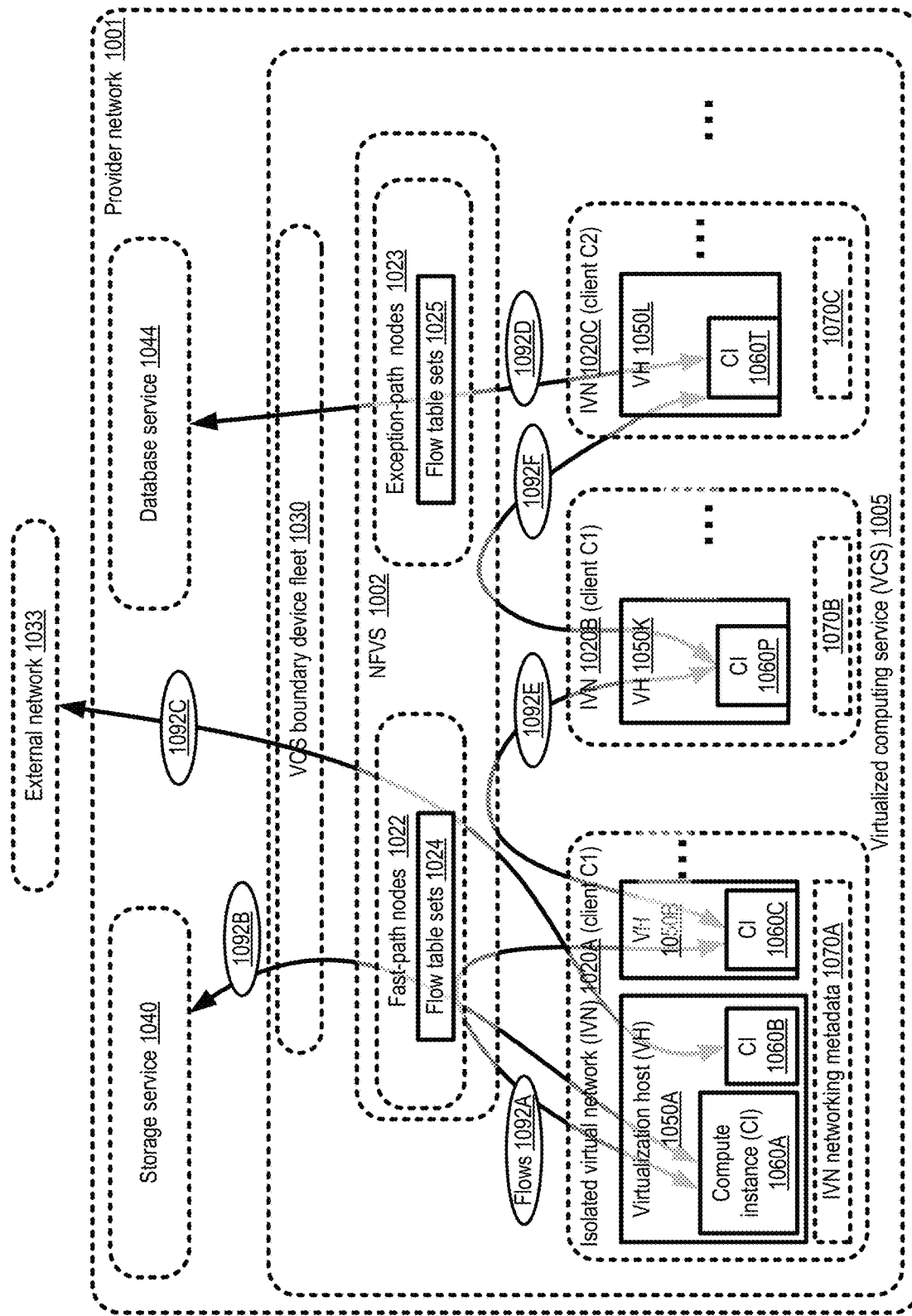
FIG. 10 illustrates example sources and destinations of traffic managed using a network function virtualization service, according to at least some embodiments.

FIG. 10 illustrates example sources and destinations of traffic managed using a network function virtualization service, according to at least some embodiments. Several different network-accessible services may be implemented at provider network 1001 of FIG. 10, including, for example, a virtual computing service (VCS) 1005, a storage service 1040 and a database service 1044. The VCS may comprise a plurality of virtualization hosts (VHs) 1050, such as 1050A, 1050B, 1050K and 1050L in the depicted embodiment, at each of which one or more compute instances (CIs) 1060 (e.g., CIs 1060A, 1060B, 1060C, 1060P and 1060T) may be instantiated on behalf of one or more VCS clients. Individual ones of the compute instances may comprise a respective virtual machine in some implementations. Each virtualization host may also include other components not shown in FIG. 10, such as a respective virtualization manager acting as an intermediary between the VMs of the host and at least some of the hardware components of the host. In some embodiments, at least some portions of a virtualization manager may be implemented at an offloading device, such as a card that is attached via a peripheral bus to the CPUs of the virtualization host. Such offloading techniques may, for example, enable a larger fraction of the computing resources of the virtualization hosts to be deployed to the virtual machines set up on behalf of clients, as opposed to being deployed for virtualization management tasks.

In at least some embodiments, the VCS 1005 may support the capability of setting up isolated virtual networks (IVNs) on behalf of various clients. Each IVN 1020 may include a respective subset of resources of the VCS, over whose networking configuration the client is granted substantial flexibility as mentioned earlier. For example, IVN 1020A (established for client C1) includes VHs 1050A and 1050B in the depicted embodiment, IVN 1020B (also set up for client C1) includes VH 1050K, and IVN 1020C (set up for client C2) includes VH 1050L. A given client such as C1 may establish multiple IVNs for various purposes—e.g., IVN 1020A may be set up for hosting a web application for access from external networks 1033 (which may for example include portions of the public Internet and/or a client-owned network), while IVN 1020B may be set up for the development of the web applications. Generally speaking, the VCS may allow the traffic associated with a given IVN to be isolated or separated from the traffic associated with any other IVN in the depicted embodiment, unless of course the clients for whom the IVNs are established indicate otherwise. With respect to a given IVN, in some embodiments the client may make various networking decisions such as IP address assignment, subnet configuration and/or enforcement of security rules regarding incoming and outgoing traffic independently of the corresponding decisions made with respect to other IVNs. For example, a particular private IP address which is assigned to a CI 1060B at VH 1050A of IVN 1020A may also happen be assigned to CI 1060T at VH 1050L of IVN 1020C. Thus, in at least some embodiments, with respect to many aspects of network management, each IVN may effectively be treated by the corresponding client as a standalone network such as one which may be established at the client's private data center. Each IVN may have an associated set of networking metadata, such as 1070A for IVN 1020A, 1070B for IVN 1020B, and 1070C for IVN 1070C. IVNs may also be referred to as virtual private clouds in some embodiments.

In the embodiment depicted in FIG. 10, a network function virtualization service (NFVS) 1002, with functionality and capabilities similar to NFVS 102 of FIG. 1, may be implemented at least in part for traffic originating at or directed to the compute instances 1060. The NFVS 1002 may comprise a set of fast-path nodes 1022 and exception path nodes 1023. Individual ones of the fast path nodes may maintain respective flow table sets 1024, including signature tables which store flow information expiration criteria as well as shortened versions of flow keys/identifiers as discussed earlier. Individual ones of the exception-path nodes may also maintain respective flow table sets 1025, including signature tables which store flow information expiration criteria as well as shortened versions of flow keys/identifiers in the depicted embodiment. Expired entries may be efficiently evicted at both types of nodes of the NFVS, e.g., using techniques similar to those illustrated in FIG. 9 in some embodiments. The networking metadata 1070 of an IVN may include addresses for the fast-path nodes 1022 of NFVS 1002 for various packet processing requirements associated with the IVN in the depicted embodiment. For example, if source address substitution is to be implemented for packets originating at CIs of IVN 1020A, in some embodiments a gateway for outbound traffic may be configured at IVN 1020A specifically for those packets. The metadata 1070A may include an indication of one or more IP addresses assigned to the gateway, which may be mapped to one or more fast-path nodes of NFVS 1002, e.g., using virtual network interfaces. Similarly, the IVN networking metadata may include indications of the interfaces and/or addresses of the NFVS which are to be used for other types of packet processing applications, including multicast, anycast and the like in different embodiments.

Some types of packet processing may be required for traffic originating and terminating within a given IVN in the depicted embodiment, such as packet flows 1092A which comprise packets flowing between different CIs of IVN 1020A (e.g., 1060A and 1060C). Other types of packet processing or transformations may be implemented with respect to packet flows 1092C originating at external networks 1033 and destined for CIs such as 1060B within one or more IVNs. For example, an application may be implemented at CI 1060B, and client requests directed to that application may originate at various devices on the public Internet and/or client-owned external networks. Responses to such requests may travel in the opposite direction—e.g., from CI 1060B to the external network. Request packets as well as response packets may pass through the NFVS 1002 in the depicted embodiment for packet flows 1092C. In at least some embodiments, a fleet of VCS edge devices 1030 may be used as intermediaries between the VCS and other services or external networks 1033. The VCS edge devices may be responsible for implementing an encapsulation protocol used at the VCS in some embodiments, e.g., for directing packets addressed to a particular CI 1060 to a NIC (network interface card) associated with a virtualization manager at the VM's virtualization host.

In some embodiments the NFVS 1002 may be used as a scalable and secure channel for traffic between IVNs. For example packet flows 1092E may comprise packets transmitted between IVNs 1020A and 1020B of the same client C1 via NFVS 1002, while packet flows 1092F may comprise packets transmitted between the IVNs of two different clients (IVN 1020B of client C1 and IVN 1020C of client C2) in the depicted embodiment. In some embodiments in which the NFVS 1002 is to serve as a conduit between two different clients' IVNs, both clients may have to approve the establishment of connectivity before the NFVS starts processing the cross-IVN packets. The NFVS 1002 may also be used for processing packet flows between different services of the provider network in some embodiments. For example, packet flows 1092B and 1092D between IVNs of the VCS and other services such as database service 1044 or storage service 1040 may be processed at NFVS 1002 in the depicted embodiment. In at least one embodiment, the NFVS 1002 may be used to process packets directed from one external network to another. It is noted that not all the CIs of the VCS may be assigned to clients of the VCS; some CIs may be used for internal purposes in various embodiments. In at least one embodiment, as mentioned earlier, some CIs may be used for the nodes at one or more layers of the NFVS. In some embodiments, the NFVS may not necessarily be employed for one or more of the kinds of traffic flows illustrated in FIG. 10.

Figure 11:
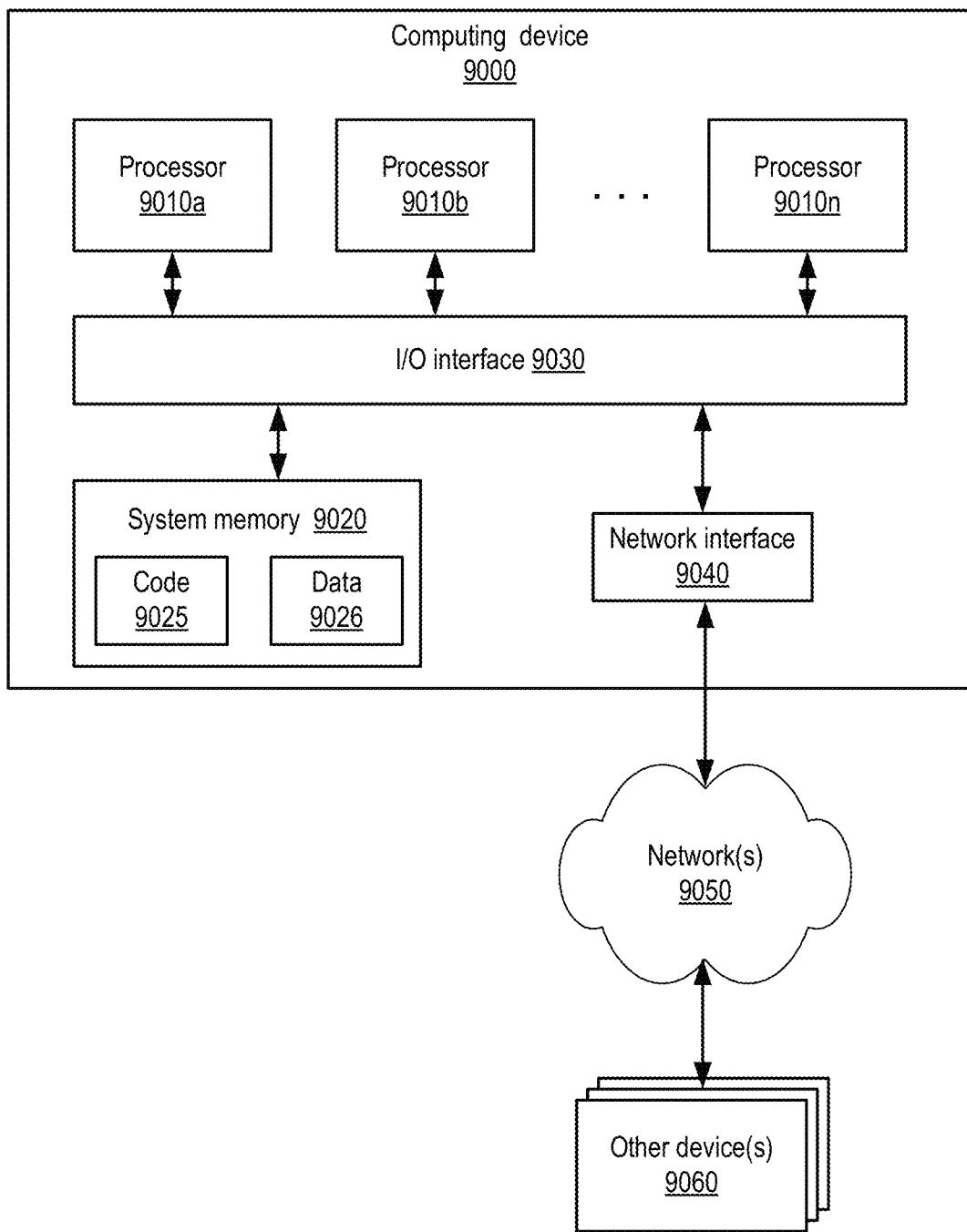
FIG. 11 is a block diagram illustrating an example computing device that may be used in at least some embodiments.

In at least some embodiments, a server that implements the types of techniques described herein (e.g., various functions of an NFVS or a VCS), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    one or more computing devices;
    one or more computing devices comprising one or more respective processors and memory storing instructions that upon execution on or across the one or more computing devices cause the one or more computing devices to:
        in a particular entry of a plurality of entries within a particular bucket of a plurality of buckets of a signature table of an application implemented using a plurality of nodes of a network function virtualization service of a cloud provider network, (a) a first signature corresponding to a first packet flow and (b) a first expiration criterion for information pertaining to the first packet flow, wherein the first packet flow is distinguished from other packet flows based on one or more attributes of a set of flow attributes including at least a source address, a destination address, and a network protocol, wherein the information pertaining to the first packet flow indicates a first routing action to be implemented for one or more packets of the first packet flow, and wherein at least a portion of the information is stored in a multi-element object separate from the signature table;

perform, with respect to the one or more packets of the first packet flow, the first routing action after accessing a representation of the first routing action from an element of the multi-element object, wherein the element is selected from the multi-element object based at least in part on (a) a bucket identifier of the particular bucket and (b) an entry identifier of the particular entry; and in response to (a) receiving a particular packet of a second packet flow at a node of the plurality of nodes and (b) determining that the particular bucket of the signature table is a candidate bucket for containing a signature of the second packet flow:

initiate eviction of respective signatures stored within one or more entries of the particular bucket including a second entry, wherein eviction of a signature stored within the second entry is initiated without receiving an eviction request associated with a packet flow whose signature is stored within the second entry, and wherein eviction of the signature stored within the second entry is initiated based at least in part on a determination that an expiration criterion stored in the second entry has been satisfied.

2. The system as recited in claim 1, wherein the one or more computing devices include further instructions that upon execution on or across the one or more computing devices further cause the one or more computing devices to:

store, in the second entry of the particular bucket, (a) a second signature corresponding to the second packet flow and (b) a second expiration criterion for information pertaining to the second packet flow; and store, in another element of the multi-element object, a representation of a second routing action to be implemented for packets of the second packet flow, wherein the other element is selected from among a plurality of elements of the multi-element object based at least in part on an entry identifier of the second entry.

3. The system as recited in claim 2, wherein the representation of the first routing action occupies a first number of bytes, wherein the representation of the second routing action occupies a second number of bytes, and wherein the first number of bytes differs from the second number of bytes.

4. The system as recited in claim 1, wherein the one or more computing devices include further instructions that upon execution on or across the one or more computing devices further cause the one or more computing devices to:

determine, based at least in part on the set of flow attributes of the first packet flow, a key associated with the first packet flow; and select, from among the plurality of buckets of the signature table, based at least in part on the key, the particular bucket for storing the signature of the first packet flow.

5. The system as recited in claim 4, wherein the key associated with the first packet flow is expressed using a first number of bits, and wherein the signature corresponding to the first packet flow is expressed using a second number of bits which differs from the first number of bits.

6. A computer-implemented method, comprising:

storing, in a particular entry of a plurality of entries within a particular bucket of a plurality of buckets of a signature table, (a) a first signature corresponding to a first packet flow and (b) a first expiration criterion for information pertaining to the first packet flow, wherein the information indicates an action to be implemented for one or more packets of the first packet flow at a network function virtualization service, and wherein at least a portion of the information is stored at least in a multi-element object separate from the signature table;

performing, with respect to the one or more packets of the first packet flow, the action after accessing at least some information from an element of the multi-element object, wherein the element is selected from the multi-element object based at least in part on (a) a bucket identifier of the particular bucket and (b) an entry identifier of the particular entry; and in response to (a) receiving a particular packet of a second packet flow at the network function virtualization service and (b) determining that the particular bucket of the signature table is a candidate bucket for containing a signature of the second packet flow:

initiating eviction of respective signatures stored within one or more entries of the particular bucket including a second entry, wherein eviction of a signature stored within the second entry is initiated without receiving an eviction request associated with a packet flow whose signature is stored within the second entry, and wherein eviction of the signature stored within the second entry is initiated based at least in part on a determination that an expiration criterion stored in the second entry has been satisfied.

7. The computer-implemented method as recited in claim 6, further comprising:

storing, in the second entry of the particular bucket, (a) a second signature corresponding to the second packet flow and (b) a second expiration criterion for information pertaining to the second packet flow; and storing, in another element of the multi-element object, an action to be implemented for packets of the second packet flow, wherein the other element is selected from among a plurality of elements of the multi-element object based at least in part on an entry identifier of the second entry.

8. The computer-implemented method as recited in claim 6, further comprising:

computing, based at least in part on a set of flow attributes of the first packet flow, a key associated with the first packet flow; and selecting, from among the plurality of buckets of the signature table, the particular bucket for storing the signature of the first packet flow, wherein said selecting is based at least in part on the key.

9. The computer-implemented method as recited in claim 8, wherein the key associated with the first packet flow is expressed using a first number of bits, and wherein the signature corresponding to the first packet flow is expressed using a second number of bits.

10. The computer-implemented method as recited in claim 9, wherein the second number is smaller than the first number.

11. The computer-implemented method as recited in claim 8, wherein selecting the particular bucket from among the plurality of buckets comprises applying a first hash function to the key.

12. The computer-implemented method as recited in claim 11, further comprising:

computing the signature corresponding to the first packet flow based at least in part on applying a second hash function to the key.

13. The computer-implemented method as recited in claim 6, further comprising:

determining a maximum number of entries to be included in the particular bucket based at least in part on a cache line size of a hardware processor cache of a node of the network function virtualization service.

14. The computer-implemented method as recited in claim 6, wherein the network function virtualization service comprises a plurality of nodes arranged in a plurality of layers, including one or more nodes at a fast-path layer and one or more nodes at an exception-path layer, the computer-implemented method further comprising:
 determining (a) a fast-path information expiration criterion for information pertaining to the first packet flow which is stored at the fast-path layer, and (b) an exception-path information expiration criterion for information pertaining to the first packet flow which is stored at the exception-path layer, wherein the exception-path information expiration criterion differs from the fast-path information expiration criterion, and wherein the expiration criterion stored in the second entry is one of: the fast-path information expiration criterion or the exception-path information expiration criterion.

15. The computer-implemented method as recited in claim 6, further comprising:
 in response to (a) receiving the particular packet of the second packet flow at the network function virtualization service, and (b) determining that the particular bucket of the signature table is a candidate bucket for containing a signature of the second packet flow, initiating a traversal of the particular bucket to determine whether the signature of the second packet flow is present in the particular bucket, wherein the eviction of the signature stored in the second entry is performed during the traversal.

16. One or more non-transitory computer-accessible storage media storing program instructions that when executed on or across one or more processors cause the one or more processors to:
 store, in a particular entry of a plurality of entries within a particular entry group of a plurality of entry groups of a first object maintained at a packet processing service, (a) a first shortened representation of an identifier of a first packet flow and (b) a first expiration criterion for information pertaining to the first packet flow, wherein the information indicates an action to be implemented for one or more packets of the first packet flow, and wherein at least a portion of the information is stored in a second object maintained at the packet processing service;
 perform, with respect to the one or more packets of the first packet flow, the action after accessing at least some information pertaining to the first packet flow from an element of the second object, wherein the element is selected from among multiple elements of the second object based at least in part on (a) a group identifier of the particular entry group and (b) an entry identifier of the particular entry; and
 in response to (a) receiving a particular packet of a second packet flow and (b) determining that the particular entry group is a candidate for containing a shortened representation of an identifier of the second packet flow:
  store respective indications that one or more in-use entries of the particular entry group including a second entry are available for re-use, wherein an indication that the second entry is available for re-use is stored based at least in part on a determination that an expiration criterion stored in the second entry has been satisfied, and wherein the indication that the second entry is available for re-use is stored without receiving an indication that a packet flow for which the second entry was in use has terminated.

17. The one or more non-transitory computer-accessible storage media as recited in claim 16, storing further program instructions that when executed on or across one or more processors further cause the one or more processors to:
 store, in the second entry, (a) a second shortened representation of an identifier of the second packet flow and (b) a second expiration criterion for information pertaining to the second packet flow; and
 store, in another element of the second object, an indication of another action to be implemented for packets of the second packet flow, wherein the other element is selected from among a plurality of elements of the second object based at least in part on an entry identifier of the second entry.

18. The one or more non-transitory computer-accessible storage media as recited in claim 16, storing further program instructions that when executed on or across one or more processors further cause the one or more processors to:
 compute, based at least in part on a set of flow attributes of the first packet flow, a key associated with the first packet flow; and
 select, from among the plurality of entry groups of the first object, based at least in part on the key, the particular entry group for storing the shortened representation of the identifier of the first packet flow.

19. The one or more non-transitory computer-accessible storage media as recited in claim 18, storing further program instructions that when executed on or across one or more processors further cause the one or more processors to:
 select the particular entry group from among the plurality of entry groups comprises applying a first hash function to the key.

20. The one or more non-transitory computer-accessible storage media as recited in claim 19, storing further program instructions that when executed on or across one or more processors further cause the one or more processors to:
 apply a second hash function to the key to determine the shortened representation of the identifier of the first packet flow.

\* \* \* \* \*